United States Patent
Byrd et al.

(10) Patent No.: US 9,032,204 B2
(45) Date of Patent: May 12, 2015

(54) METHODS AND SYSTEMS FOR PROVIDING A SIGNED DIGITAL CERTIFICATE IN REAL TIME

(75) Inventors: Nathaniel David Byrd, Saint Peters, MO (US); Jenny Qian Zhang, Wildwood, MO (US); Eric G. Alger, Edwardsville, IL (US)

(73) Assignee: MasterCard International Incorporated, Purchase, NY (US)

( * ) Notice: Subject to any disclaimer, the term of this patent is extended or adjusted under 35 U.S.C. 154(b) by 200 days.

(21) Appl. No.: 13/335,579

(22) Filed: Dec. 22, 2011

(65) Prior Publication Data

US 2012/0179907 A1 Jul. 12, 2012

Related U.S. Application Data

(60) Provisional application No. 61/430,820, filed on Jan. 7, 2011.

(51) Int. Cl.
*H04L 29/06* (2006.01)
*H04L 9/32* (2006.01)

(52) U.S. Cl.
CPC .................. *H04L 9/3268* (2013.01)

(58) Field of Classification Search
CPC ....... H04L 9/30; H04L 9/3268; H04L 9/3073; H04L 9/3066; H04L 9/321; H04L 9/3263; H04L 9/0844; H04L 9/0891; H04L 63/12; H04L 63/1441; H04L 63/0442; H04L 63/062; H04L 63/0823
USPC ............. 713/156, 187; 726/5; 705/42, 44, 50, 705/71, 76
See application file for complete search history.

(56) References Cited

U.S. PATENT DOCUMENTS

| 5,355,484 A | 10/1994 | Record et al. |
| 6,002,871 A | 12/1999 | Duggan et al. |

(Continued)

FOREIGN PATENT DOCUMENTS

| WO | WO 02/25495 A1 * | 9/2000 | .............. G06F 17/30 |
| WO | 0225495 A1 | 3/2002 | |

OTHER PUBLICATIONS

An International Search Report, dated Apr. 15, 2013 for co-pending International application No. PCT/US11/67522 filed Dec. 28, 2011.

(Continued)

*Primary Examiner* — Thuong Nguyen
(74) *Attorney, Agent, or Firm* — Armstrong Teasdale LLP

(57) ABSTRACT

A method and system for signing a digital certificate in real time for accessing a service application hosted within a service provider (SP) computer system through an open application programming interface (API) platform is provided. The API platform is in communication with a memory device. The method includes receiving registration data from a developer computer device wherein the developer computer device is associated with a developer and configured to store a developer application, receiving a certificate signing request (CSR) from the developer computer device wherein the CSR includes a public key associated with the developer, verifying the registration data as being associated with the developer, signing the CSR to produce a signed certificate after verifying the registration data wherein the verifying and signing steps are performed by the SP computer system in real time, and transmitting the signed certificate and a client ID to the developer computer device.

23 Claims, 11 Drawing Sheets

(56) References Cited

U.S. PATENT DOCUMENTS

| | | | |
|---|---|---|---|
| 6,005,942 A | 12/1999 | Chan et al. | |
| 6,115,744 A | 9/2000 | Robins et al. | |
| 6,385,606 B2 | 5/2002 | Inohara et al. | |
| 6,481,632 B2 | 11/2002 | Wentker et al. | |
| 6,560,581 B1 | 5/2003 | Fox et al. | |
| 6,567,828 B2 | 5/2003 | Inohara et al. | |
| 6,618,856 B2 | 9/2003 | Coburn et al. | |
| 6,741,992 B1 | 5/2004 | McFadden | |
| 7,003,661 B2 | 2/2006 | Beattie et al. | |
| 7,167,448 B2 | 1/2007 | Wookey et al. | |
| 7,213,235 B2 | 5/2007 | Ziv | |
| 7,308,491 B2 | 12/2007 | Gosewehr | |
| 7,383,231 B2 | 6/2008 | Gupta et al. | |
| 7,418,596 B1* | 8/2008 | Carroll et al. | 713/169 |
| 7,426,737 B2 | 9/2008 | Hellenthal et al. | |
| 7,566,002 B2 | 7/2009 | Love et al. | |
| 7,647,493 B2 | 1/2010 | Bajko et al. | |
| 7,652,990 B2 | 1/2010 | Bryson | |
| 7,660,902 B2 | 2/2010 | Graham et al. | |
| 7,681,206 B2 | 3/2010 | Oh et al. | |
| 7,698,398 B1 | 4/2010 | Lai | |
| 7,712,085 B2 | 5/2010 | McCollum et al. | |
| 7,747,569 B2 | 6/2010 | Comi et al. | |
| 7,826,829 B2 | 11/2010 | Pousti | |
| 7,849,010 B2 | 12/2010 | Deyoe et al. | |
| 7,860,484 B2 | 12/2010 | Pousti | |
| 8,001,555 B2 | 8/2011 | Hellenthal et al. | |
| 8,171,074 B2 | 5/2012 | Nakazawa | |
| 8,438,535 B2 | 5/2013 | Sun | |
| 8,458,808 B2 | 6/2013 | Hill et al. | |
| 8,464,219 B1 | 6/2013 | Wilkerson | |
| 8,484,460 B1* | 7/2013 | Vaughn | 713/155 |
| 8,490,080 B2 | 7/2013 | Janzen | |
| 2002/0004773 A1 | 1/2002 | Xu et al. | |
| 2002/0032665 A1 | 3/2002 | Creighton et al. | |
| 2002/0095656 A1 | 7/2002 | Clark et al. | |
| 2002/0120546 A1 | 8/2002 | Zajac | |
| 2003/0028599 A1* | 2/2003 | Kolsky | 709/206 |
| 2003/0063750 A1* | 4/2003 | Medvinsky et al. | 380/277 |
| 2003/0135639 A1 | 7/2003 | Marejka et al. | |
| 2003/0237073 A1 | 12/2003 | Gardas et al. | |
| 2004/0111379 A1* | 6/2004 | Hicks et al. | 705/76 |
| 2004/0139021 A1 | 7/2004 | Reed et al. | |
| 2004/0268142 A1* | 12/2004 | Karjala et al. | 713/200 |
| 2005/0069136 A1* | 3/2005 | Thornton et al. | 380/277 |
| 2005/0114367 A1 | 5/2005 | Serebrennikov | |
| 2005/0157646 A1 | 7/2005 | Addagatla et al. | |
| 2005/0166262 A1* | 7/2005 | Beattie et al. | 726/5 |
| 2006/0015463 A1* | 1/2006 | Gupta et al. | 705/52 |
| 2006/0026552 A1 | 2/2006 | Mazzitelli et al. | |
| 2006/0150176 A1 | 7/2006 | Dorricott et al. | |
| 2006/0153368 A1* | 7/2006 | Beeson | 380/30 |
| 2006/0161878 A1 | 7/2006 | Koh et al. | |
| 2006/0184452 A1 | 8/2006 | Barnes et al. | |
| 2006/0195401 A1 | 8/2006 | Davis et al. | |
| 2006/0242151 A1 | 10/2006 | Jogand-Coulomb et al. | |
| 2006/0248205 A1 | 11/2006 | Randle et al. | |
| 2007/0074034 A1 | 3/2007 | Adams et al. | |
| 2007/0162898 A1 | 7/2007 | Ramani et al. | |
| 2008/0046279 A1 | 2/2008 | Leahy et al. | |
| 2008/0052373 A1 | 2/2008 | Pousti | |
| 2008/0077560 A1 | 3/2008 | Comi et al. | |
| 2008/0177889 A1 | 7/2008 | Beyer et al. | |
| 2008/0184029 A1* | 7/2008 | Sims et al. | 713/156 |
| 2008/0194228 A1 | 8/2008 | Pousti et al. | |
| 2008/0209094 A1 | 8/2008 | Travis | |
| 2008/0209451 A1 | 8/2008 | Michels et al. | |
| 2008/0288624 A1 | 11/2008 | Armangil | |
| 2009/0094584 A1 | 4/2009 | Dheap et al. | |
| 2009/0132536 A1 | 5/2009 | Brown et al. | |
| 2009/0219940 A1 | 9/2009 | Jansson | |
| 2009/0249071 A1 | 10/2009 | De Atley et al. | |
| 2009/0254482 A1 | 10/2009 | Vadlamani et al. | |
| 2009/0310789 A1* | 12/2009 | Sie et al. | 380/282 |
| 2009/0313069 A1 | 12/2009 | Love et al. | |
| 2009/0320050 A1 | 12/2009 | Pousti et al. | |
| 2009/0327139 A1 | 12/2009 | Shah et al. | |
| 2009/0328174 A1 | 12/2009 | Cen et al. | |
| 2010/0057774 A1 | 3/2010 | Pizano et al. | |
| 2010/0100398 A1 | 4/2010 | Auker et al. | |
| 2010/0115585 A1 | 5/2010 | Cohen | |
| 2010/0138316 A1 | 6/2010 | Connors et al. | |
| 2010/0146487 A1 | 6/2010 | Chun et al. | |
| 2010/0169963 A1* | 7/2010 | Kleinpeter et al. | 726/10 |
| 2010/0188992 A1 | 7/2010 | Raleigh | |
| 2010/0192120 A1 | 7/2010 | Raleigh | |
| 2010/0232594 A1 | 9/2010 | Lawson et al. | |
| 2010/0250748 A1 | 9/2010 | Sivasubramanian et al. | |
| 2010/0251242 A1 | 9/2010 | Sivasubramanian et al. | |
| 2010/0262956 A1 | 10/2010 | Okada | |
| 2010/0275012 A1* | 10/2010 | Kido et al. | 713/156 |
| 2010/0306072 A1 | 12/2010 | Ford, Jr. et al. | |
| 2010/0325155 A1 | 12/2010 | Skinner et al. | |
| 2011/0113405 A1 | 5/2011 | Guerrera et al. | |
| 2011/0153590 A1 | 6/2011 | Chang et al. | |
| 2011/0154027 A1* | 6/2011 | Liu et al. | 713/158 |
| 2011/0154130 A1 | 6/2011 | Helander et al. | |
| 2011/0154302 A1 | 6/2011 | Balko et al. | |
| 2011/0184866 A1 | 7/2011 | Shakkarwar | |
| 2011/0196914 A1 | 8/2011 | Tribbett | |
| 2011/0296440 A1 | 12/2011 | Laurich et al. | |
| 2012/0017222 A1 | 1/2012 | May | |
| 2012/0102179 A1 | 4/2012 | Qiu et al. | |
| 2012/0179587 A1 | 7/2012 | Hill et al. | |
| 2012/0180021 A1 | 7/2012 | Byrd et al. | |
| 2012/0180022 A1 | 7/2012 | Hopkins | |

OTHER PUBLICATIONS

Kang, J., "IDB: Unified Query Interface for Information on the Web," University of Wisconsin-Madison, Oct. 22, 1999, www4.ncsu.edu/~jkang2/pubs/IDBMSproposal99.pdf (6 pages).

An International Search Report and Written Opinion for International Application No. PCT/US11/67189 mailed Feb. 21, 2012 (11 pgs).

An International Search Report for International Application No. PCT/US11/67181 mailed Apr. 18, 2012 (11 pgs).

An International Search Report for International Application No. PCT/US11/67208 mailed Jun. 15, 2012.

An International Search Report and Written Opinion for International Application No. PCT/US11/67201 mailed Apr. 18, 2012 (10 pgs).

An International Search Report and Written Opinion for International Application No. PCT/US11/67517 dated Mar. 20, 2012.

Xiulan Yu et al., "WSCE: A Flexible Web Service Composition Environment", [Online], IEEE 2004, pp. 1-8, [Retrieved from Internet on Nov. 9, 2013], <http://ieeexplore.ieee.org/stamp/stamp.jsp?tp=&arnumber=1314767>.

Sebastian Kabisch et al., "Optimized XML-based Web Service Generation for Service Communication in Restricted Embedded Environments", [Online], IEEE, 2011, pp. 1-8, [Retrieved from Internet on Nov. 9, 2013], <http://ieeexplore.ieee.org/stamp/stamp.jsp?tp=&arnumber=6059002>.

Ravishankar Shiroor et al., "Process Centric Guidance and Tools for Next Generation Network Service API Design", [Online], 2010 IEEE, pp. 1-6, [Retrivedfrom Internet on Nov. 9, 2013], <http://ieeexplore.ieee.org/stamp/stamp.jsp?tp=&arnumber=5729408>.

Soonchul Jung et al., "Call/Messaging Open API for Telecommunication Services", [Online], IEEE 2008, pp. 1139-1143, [Retrieved from Internet on Nov. 9, 2013], <http://ieeexplore.ieee.org/stamp/stamp.jsp?tp=&arnumber=4493967>.

Saul Greenberg et al., "Phidgets: Easy Development of Physical Interfaces through Physical Widgets", [Online], ACM 2001, pp. 209-218, [Retrieved from Internet on Dec. 3, 2013], <http://citeseerx.ist.psu.edu/viewdoc/download?doi=10.1.1.186.9414&rep=rep1&type=pdf>.

Jit Biswas et al., "The IEEE P1520 Standards Initiative for Programmable Network Interface", [Online], IEEE1998, pp. 64-70, [Retrieved from Internet on Dec. 3, 2013], <http://ieeexplore.ieee.org/stamp/stamp.jsp?tp=&arnumber=722138>.

Zhengyu Liang et al., "ClusterProbe: An Open, Flexible and Scalable Cluster Monitoring Tool", [Online], IEEE 1999, pp. 1-10, [Retrieved

(56) References Cited

OTHER PUBLICATIONS from Internet on Dec. 3, 2013],<http://citeseerx.ist.psu.edu/viewdoc/download?doi=10.1.1.37.4540&rep=rep1&type=pdf>.

Gabrielle Allen et al., "The Grid Application Toolkit: Toward Generic and Easy Application Programming Interfaces for the Grid", [Online], IEEE 2005, pp. 534-550, [Retrieved from Internet on Dec. 3, 2013], <http://tangviz.cct.Isu.edu/papers/allen-ieee04-gat.pdf>.

B.J. Overeinder et al., "Web Service Access Management for Integration with Agent Systems", [Online], ACM 2008, pp. 1-7, [Retrieved from Internet on Nov. 2, 2013], <http://sysnet.ucsd.edu/-pverkaik/pubs/agentsoap-mas2008.pdf>.

David L. Martin et al., "The Open Agent Architecture: A Framework for Building Distributed Software System", [Online], 1999, pp. 1-38, [Retrieved from Internet on Nov. 2, 2013], <http://www.math.pku.edu.cn/teachers/linzq/teaching/stm/references/The/%20open%20agent%20architecture.pdf>.

Herbert H. Thompson, "The Subtle Security Risks of Web Services", [Online], 2006, pp. 604-606, [Retrieved from Internet on Nov. 2, 2013], <http://download.springer.com/static/pdf/223/art%253A10.1007%252Fs11623-006-0157-7.pdf>.

Dipanjan Chakraborty et al., "Service Composition for Mobile Environments", [Online], 2005, pp. 1-34, [Retrieved from Internet on Nov. 2, 2013], <http://aisl.umbc.edu/resources/96.pdf>.

\* cited by examiner

700

Premium Services — 702
Select one or more services that you would like to use with this production key.
- ☐ Locations
- ☐ Offers
- ☐ Payments

Free Services — 704
Select one or more services that you would like to use with this production key.
- ☐ Locations
- ☐ Offers
- ☐ Payments

Certificate
In order to get an API Key, you need to supply a PEM encoded Certificate Request File.

Certificate Request File: [          ] (Browse...)
706

(Submit) (Cancel)

Developer Premium Service Request Approval

Developer and Key Alias Request — 802

[ Select Developer and Key Alias ▽ ]

Name: First Last　　　　Address: 1237 First Street
　　　　　　　　　　　　　　　　　　　　　Newport, VA
Email: Email@somewhere.com　　　　　United States

Phone: 555 123-7654　　　Company: Co Name

Key Alias Name:

Key Alias Description:

Approve or Deny Premium Access　　Client ID

[ Approve ▽ ]　　　　　　　　　[ Client ID ▽ ]
　　　└─804　　　　　　　　　　　　└─806

Throttling Amount　　　　　　　Throttling Time Period

[ Select Throttling Amt ▽ ]　　[ 24 Hours ▽ ]
　　　└─808　　　　　　　　　　　　└─810

Comments　　　　　　　─812

[                                    ]

[ Submit ]

Monthly Billing Reports　　　　　─814

January　　February　　March　　April　　May　　June

FIG. 8

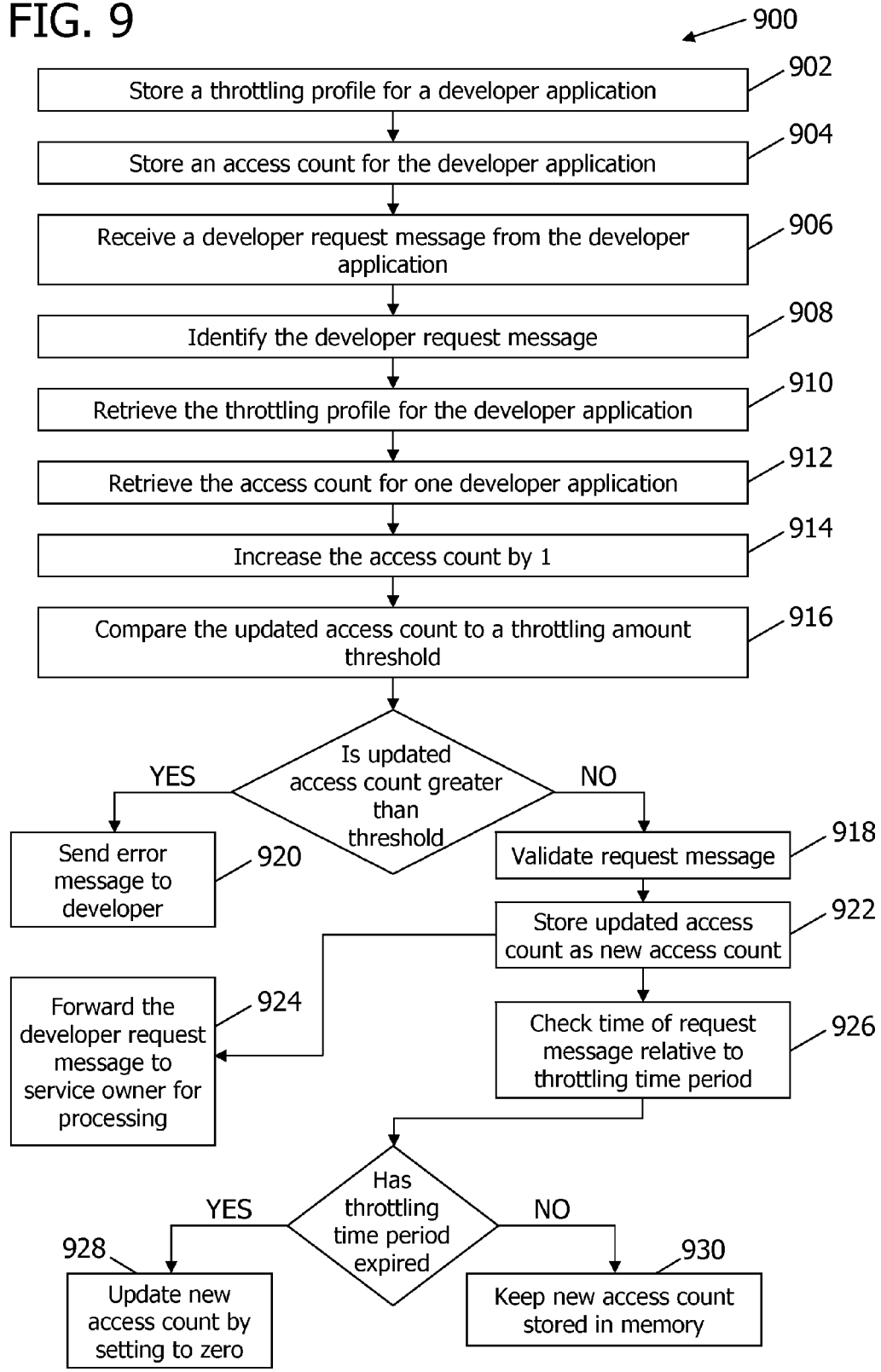

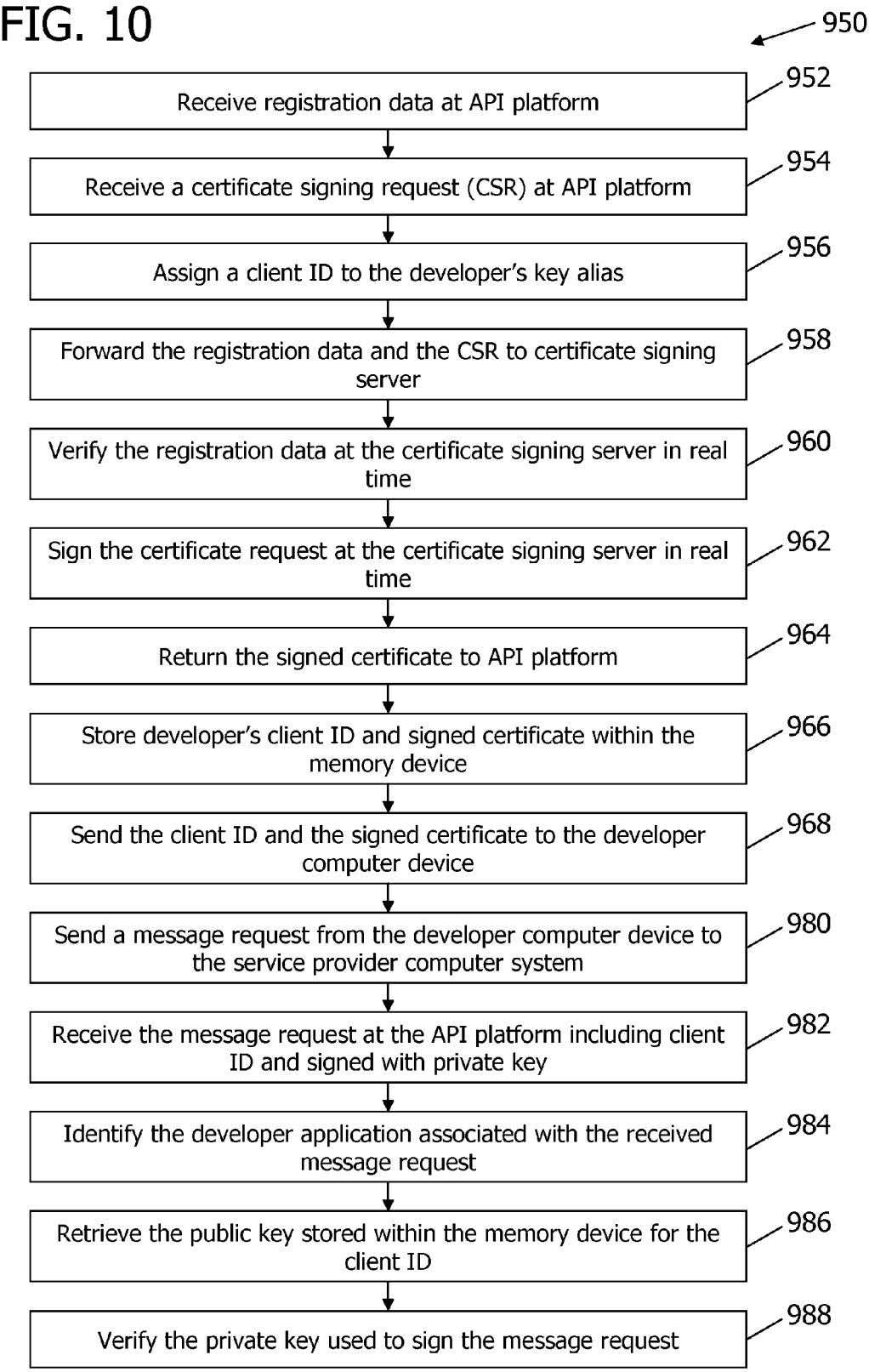

METHODS AND SYSTEMS FOR PROVIDING A SIGNED DIGITAL CERTIFICATE IN REAL TIME

CROSS REFERENCE TO RELATED APPLICATIONS

This patent application claims priority to U.S. Provisional Patent Application Ser. No. 61/430,820, filed on Jan. 7, 2011, which is hereby incorporated by reference in its entirety.

BACKGROUND OF THE INVENTION

This invention relates generally to providing a signed digital certificate in real time and, more particularly, to network-based methods and systems for registering, verifying, and signing a digital certificate in real time by a service provider computer system for a developer computer device so that the developer computer device can communicate with the service provider computer system through an open application programming interface (API) architecture.

There are service provider companies that provide a variety of services to numerous consumers. These service provider companies utilize computer systems to provide these services. For example, in the financial industry, companies such as large banks, interchange networks and payment networks provide certain financial services to consumers, companies and other banks. Oftentimes, these service provider companies provide services that include receiving, processing and storing financial data in computer systems managed by the service provider companies. In many cases, access to this financial data is restricted to certain approved users. Restricting access to such financial data provides at least some protection for the data. However, it also limits the potential uses of the data.

Software developers around the world are able to develop computer programs, sometimes called applications, that are configured to utilize data such as the data stored within computer systems used by certain service provider companies. Of course, in order for these computer programs to use such data, the developer programs must be able to access the data. One way to access the data stored by these service provider companies is through an open application programming interface (API).

By allowing software developers to access data stored within computer system used by these service provider companies, the service provider companies are able to leverage these developer applications as well as increase their transaction volume. Thus, by providing this data access to developers, these service provider companies are able to provide additional services to both existing and new customers, which in turn improves the profitability of these companies. However, the providing of such data access also creates certain risks and challenges for the service provider companies.

At least one known technique for authenticating a message request sent by a developer computer device to a service provider computer system is through the use of a digital signature. A digital signature can be used for demonstrating the authenticity of a digital message or document. A valid digital signature gives a recipient reason to believe that the message was created by a known sender, and that it was not altered in transit. Digital signatures are commonly used for software distribution, financial transactions, and in other cases where it is important to detect forgery or tampering. Thus, a service provider computer system can provide access to a developer computer device when the developer computer device submits a message request that has been digitally signed and authenticated by the service provider computer system.

However, in these known cases, in order for the developer computer device to use a digital signature that can be authenticated by the service provider computer system, the developer computer device must register with the service provider by submitting registration data including a certificate signing request (CSR) to the service provider computer system. The service provider manually reviews the registration data, and, if the service provider approves the developer, signs and returns the certificate to the developer via the developer computer device.

Unfortunately, in at least some of these known cases, hundreds and sometimes thousands of developers are seeking to obtain access on a daily basis to a service provider computer system. In these cases, the developers submit registration data and CSRs to the service provider for review and approval. This review and approval process can be extremely time consuming and costly for the service provider.

Accordingly, it would be desirable to provide a computer system having an open API for use by certain service provider companies that is configured to automatically review, verify, and approve in real time registration data including CSRs that are submitted by developer computers such that the developer computers can gain access to the service provider computer systems.

BRIEF DESCRIPTION OF THE INVENTION

In one embodiment, a computer-based method for signing a digital certificate in real time for accessing a service application hosted within a service provider (SP) computer system through an open application programming interface (API) platform is provided. The API platform is in communication with a memory device. The method includes receiving registration data from a developer computer device wherein the developer computer device is associated with a developer and configured to store a developer application, receiving a certificate signing request (CSR) from the developer computer device wherein the CSR includes a public key associated with the developer, verifying the registration data as being associated with the developer, signing the CSR to produce a signed certificate after verifying the registration data wherein the verifying and signing steps are performed by the SP computer system in real time, and transmitting the signed certificate and a client ID to the developer computer device.

In another embodiment, a computer system for signing a digital certificate in real time for accessing a service application hosted within a service provider (SP) computer system through an open application programming interface (API) platform is provided. The API platform is in communication with a memory device. The SP computer system is programmed to receive registration data from a developer computer device wherein the developer computer device is associated with a developer and configured to store a developer application, receive a certificate signing request (CSR) from the developer computer device wherein the CSR includes a public key associated with the developer, verify in real time the registration data as being associated with the developer, sign in real time the CSR to produce a signed certificate after verifying the registration data, and transmit the signed certificate and a client ID to the developer computer device.

In another embodiment, one or more computer-readable media having computer-executable instructions embodied thereon is provided. The computer-executable instructions are executed by a computer device. The instructions instruct the computer to receive registration data from a developer computer device wherein the developer computer device is associated with a developer and configured to store a developer application, receive a certificate signing request (CSR) from the developer computer device wherein the CSR includes a public key associated with the developer, verify in real time the registration data as being associated with the developer, sign in real time the CSR to produce a signed certificate after verifying the registration data, and transmit the signed certificate and a client ID to the developer computer device.

In another embodiment, a computer system for signing a digital certificate in real time for accessing a service application hosted within a service provider (SP) computer system through an open application programming interface (API) platform is provided. The computer system includes a memory device for storing data, and a service provider (SP) computer system having a processor and an open API platform. The SP computer system is in communication with the memory device. The SP computer system is programmed to: receive registration data from a developer computer device wherein the developer computer device is associated with a developer and configured to store a developer application, receive a certificate signing request (CSR) from the developer computer device wherein the CSR includes a public key associated with the developer, verify the registration data as being associated with the developer, sign the CSR to produce a signed digital certificate after verifying the registration data wherein the verifying and signing steps are performed by the SP computer system in real-time, and transmit the signed digital certificate and a client ID to the developer computer device.

In another embodiment, one or more computer-readable non-transitory media comprising a computer-executable program that instructs at least one processor to sign a digital certificate in real-time for accessing a service application hosted within a service provider (SP) computer system through an open application programming interface (API) platform is provided. The computer-executable program includes at least one code segment that instructs the at least one processor to: receive registration data from a developer computer device wherein the developer computer device is associated with a developer and configured to store a developer application, receive a certificate signing request (CSR) from the developer computer device wherein the CSR includes a public key associated with the developer, verify the registration data as being associated with the developer, sign the CSR to produce a signed digital certificate after verifying the registration data wherein the verifying and signing steps are performed in real-time, and transmit the signed digital certificate and a client ID to the developer computer device.

BRIEF DESCRIPTION OF THE DRAWINGS

FIGS. 1-10 show exemplary embodiments of the methods and systems described herein.

FIG. 1 is a simplified block diagram of an exemplary service system including a plurality of computer devices in accordance with one embodiment of the present invention.

FIG. 2 is an expanded block diagram of an exemplary embodiment of a server architecture of the service system including the plurality of computer devices in accordance with one embodiment of the present invention.

FIG. 3 is a block diagram of an exemplary embodiment of a user computer device as shown in FIGS. 1 and 2.

FIG. 4 is a block diagram of an exemplary embodiment of a server computer device as shown in FIGS. 1 and 2.

FIG. 5 is a more detailed block diagram of an exemplary configuration of the service provider computer system in communication with other computer devices as shown in FIGS. 1 and 2.

FIG. 7 is an exemplary production key request user interface for requesting premium access to the service provider computer system shown in FIG. 5.

FIG. 8 is an exemplary premium service request approval user interface for approving a premium access request by a service owner computer device shown in FIG. 5.

FIG. 9 is a data flow chart showing an exemplary process of validating a throttling profile for a developer application accessing the service provider computer system shown in FIG. 5.

FIG. 10 is a data flow chart showing an exemplary process of registering, verifying, and providing a signed digital certificate to a developer in real time for accessing the service provider computer system shown in FIG. 5.

DETAILED DESCRIPTION OF THE INVENTION

Figure 1:
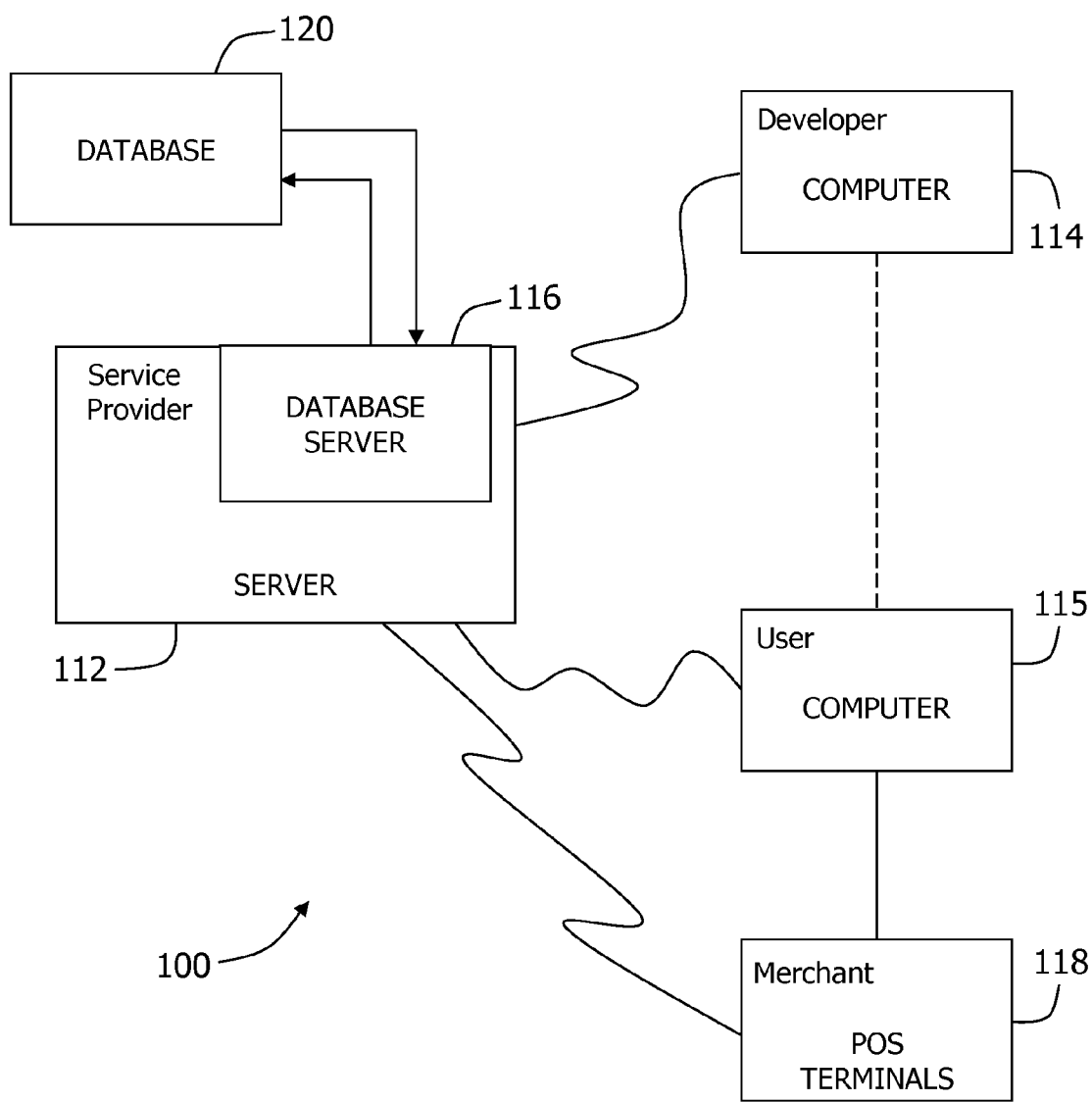

Embodiments of the methods and systems described herein enable a service provider company associated with a service provider computer system, which includes service applications stored therein, to (i) offer access to the service applications for use by developers of computer software applications, (ii) register developers with the service provider computer system including receiving a certificate signing request (CSR) from each of the developers, (iii) assign a client ID to each of the developers within the service provider computer device, (iv) verify the registration data provided by the developers; (v) sign the certificate by the service provider, and return the client ID and signed certificate to the developers for future identification and authentication, and (v) manage the identities and digital keys associated with the developers for processing future message requests from the developers.

In the example embodiment, the certificate signing request (CSR) and key generation process is started by the developer after registration on the API portal. The keys/certificates are generated by the developer outside of the SP computer system with open source tools such as Open SSL. The basic steps in the process are as follows: (1) the developer uses an open source tool to generate a private and public key pair, and requests a signed certificate providing the CSR from the generated public/private key pair to the API portal; (2) the open source tool provides the private and public key pair, and the public key is included in the CSR (the private key is held private by the developer); (3) the developer uploads the CSR which contains the public key to the API platform; (4) the API platform assigns a client ID and signs the developer's public key, wherein the combination of the client ID and the developer's signed digital certificate comprises the production key; (5) the developer then uses the client ID (which is included in the production key) in each message sent to the API platform that is digitally signed with the private key on the developer's computer device; (6) the API platform uses the client ID to identify which public key to use to verify the private key used to sign the message. Tools used to create keys and a CSR typically ask the developer to enter the following information when creating a CSR and key pair: name, organization, organizational unit, city, state or province, and country.

More specifically, the API platform includes a developer and application registration service (referred to as the "API registration service"), which helps manage the registration process of the developers with the service provider computer system. The API registration service is in communication with a certificate signing server that is configured to: receive the CSR submitted by the developer; automatically review the registration data submitted by the developer; automatically verify the registration data submitted by the developer including developer name, organization, organizational unit, city, state or province, and country; and sign the developer's certificate upon verification and approval. The certificate signing server, which is in communication with the API platform, is configured to review, verify and approve in real time so that a developer can be quickly registered with the service provider computer system without requiring a manual review process by the service provider.

After a developer registers with the API platform, the API platform stores the developer registration data in a memory device for future verifications. For example, the registration data may include the key alias associated with the developer application, the client ID, the public key, entity authorization, expected usage, and other registration data. The registration data is stored within the memory device. Accordingly, when a message request is submitted by a developer application to the service provider computer system, the API platform receives the message request which includes the client ID associated with the developer or developer application. The message request is also digitally signed with the developer's private key. The API platform uses the received client ID to identify which public key to use to verify the private key used to sign the message. The client ID and the public key are stored within the API memory device. Accordingly, the API platform is able to verify that each message received by the API platform was sent by the developer application and has not been tampered with.

In the example embodiment, a user (e.g., a developer, a consumer, a merchant, an acquirer, a processor or an issuer) may request multiple signed certificates for a particular identity, as well as multiple identities for a particular signed certificate.

In the example embodiment, the service provider computer system is a financial service computer system that provides financial transaction services to developers, consumers, merchants, acquirers and/or issuers. The services may include providing data representing financial transactions, processing payment card transactions, locating banks or ATMs, providing information such as discounts and offers, etc. In another embodiment, the service provider computer system is a non-financial service computer system that provides non-financial transaction services to users, developers, consumers, merchants, acquirers and/or issuers.

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: a) a developer, using a developer computer device, accesses a service provider computer system through an API portal; b) the developer uses the API portal to submit registration data including first name, last name, username, password, email address, country, street address, city, state/province, postal code, phone number, company/university affiliation; c) the developer also uploads, using the API portal, a certificate signing request (CSR), wherein the developer generates a private and public key pair using tools outside of the service provider computer system and the CSR includes the public key; d) the API platform assigns a client ID to a key alias, wherein the key alias is selected by the developer to identify the developer application; e) the API platform forwards the registration data and the CSR to a certificate signing server; f) the certificate signing server verifies the registration data by automatically validating the data found in the CSR request against the registration data, signs the certificate request, and returns it to the API platform in real time; g) the API platform stores within a memory device the client ID and the signed certificate (developer's public key), wherein the combination of the client ID and the developer's signed digital certificate comprises the production key; and h) the API platform sends the client ID and the signed certificate back to the developer at the developer computer device.

In the future, when the developer application sends a message request to the service provider computer system, the API platform receives the message request which includes the client ID and a digital signature (encrypted) created with the developer's private key. The API platform uses the received client ID to identify which public key to use to verify (decrypt) the private key used to sign the message. The API platform uses the client ID and the public key stored within the API memory device, to verify the message. Each message request received by the API platform is verified in the same manner, verifying that the message was sent by the developer application and has not been tampered with.

FIG. 1 is a simplified block diagram of an exemplary service system 100 including a plurality of computer devices in accordance with one embodiment of the present invention. System 100 includes a service provider system (e.g., financial services provider or non-financial services provider) that allows developers of computer applications to access a variety of service applications hosted by the service provider (SP) computer system such that the developer applications can utilize data stored within the SP computer system. The developer applications can be utilized by the developer via a developer computer system or can be offered to a consumer, a merchant, an acquirer or an issuer (collectively a "user") for use by the users via user computer systems.

More specifically, in the example embodiment, system 100 includes a server system 112, which is a type of computer system, and a plurality of client sub-systems (also referred to as client systems 114 and 115) connected to server system 112. In one embodiment, client systems 114, 115 are computers including a web browser, such that server system 112 is accessible to client systems 114, 115 using the Internet. Client systems 114, 115 are interconnected to the Internet through many interfaces including a network, such as a local area network (LAN) or a wide area network (WAN), dial-in-connections, cable modems, and special high-speed ISDN lines. Client systems 114, 115 could be any device capable of interconnecting to the Internet including a web-based phone, personal digital assistant (PDA), or other web-based connectable equipment.

System 100 also includes point-of-sale (POS) terminals 118, which may be connected to client systems 114, 115 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114, 115 by logging onto server system 112 through one of client systems 114, 115. In an alternative embodiment, database 120 is stored remotely from server system 112 and may be non-centralized.

Database 120 may store transaction data generated as part of sales activities conducted over the services network including data relating to merchants, account holders or customers, developers, issuers, acquirers, purchases made, and services provided by system 100. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, client system 114 may be associated with a developer of computer applications and may be referred to as a developer computer device, and client system 115 may be associated with a consumer, an acquirer or an issuer and may be referred to as a user computer device. Developer computer device 114 stores developer applications that a user may access and utilize via user computer device 115. Server system 112 may be associated with a service provider (SP) and may be referred to as a SP computer device. In the example embodiment, an SP may include a payment network provider, an interchange network provider, or any other provider of financial or non-financial services.

In the embodiment where the SP is an interchange network provider, system 100 includes POS terminals 118, which may be associated with a merchant. In this embodiment, system 100 may be part of a multi-party payment card industry system for enabling ordinary payment-by-card transactions such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

For example, in a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer tenders payment for a purchase with a payment card (also known as a financial transaction card), the merchant requests authorization from the merchant bank for the amount of the purchase. The request may be performed over the telephone, but is usually performed through the use of a point-of-sale terminal, which reads the consumer's account information from the magnetic stripe on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Although the SP has been described herein as an interchange network provider, it does not have to be so limited. As indicated above, the SP may also be a payment network provider or any other provider of financial services. In these embodiments, a transaction card, a payment or even a purchase are not necessarily needed to utilize the services provided by the SP.

Figure 2:
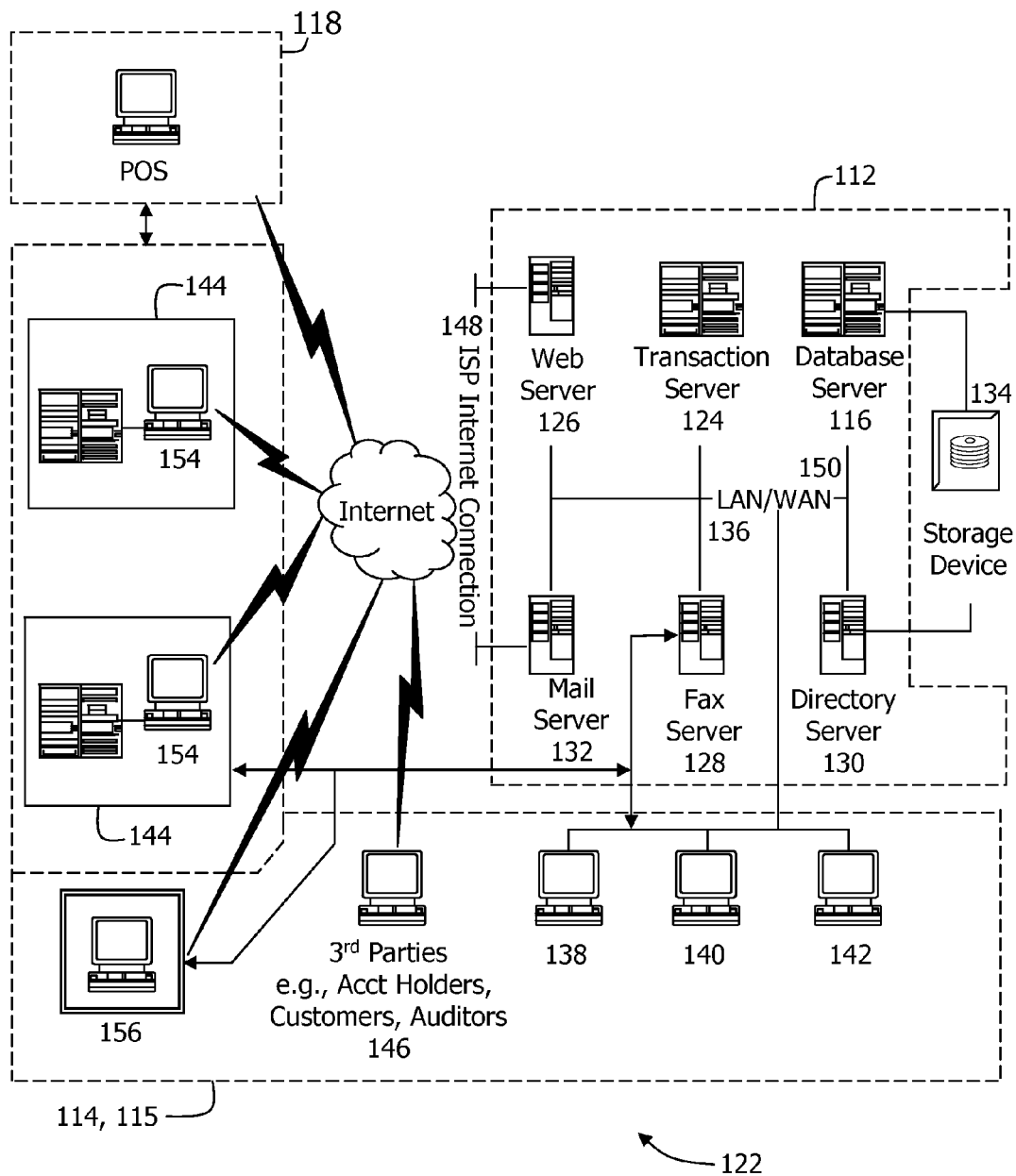

FIG. 2 is an expanded block diagram of an exemplary embodiment of a server architecture of a service system 122 including other computer devices in accordance with one embodiment of the present invention. Components in system 122, identical to components of system 100 (shown in FIG. 1), are identified in FIG. 2 using the same reference numerals as used in FIG. 1. System 122 includes server system 112, client systems 114 and 115, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 3:
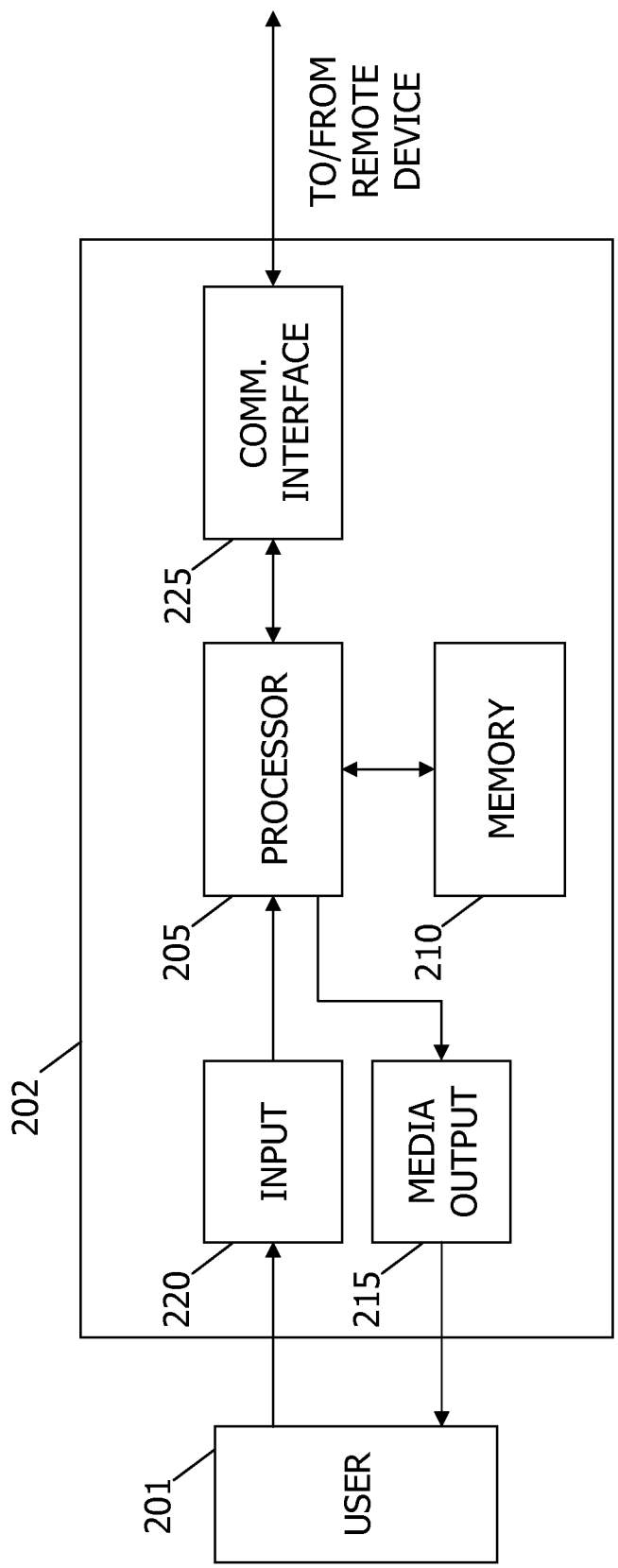

FIG. 3 illustrates an exemplary configuration of a user computer device 202 operated by a user 201. User computer device 202 may include, but is not limited to, client systems 114, 115, 138, 140, and 142, 146, POS terminal 118, workstation 154, and manager workstation 156 (shown in FIG. 2).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 4:
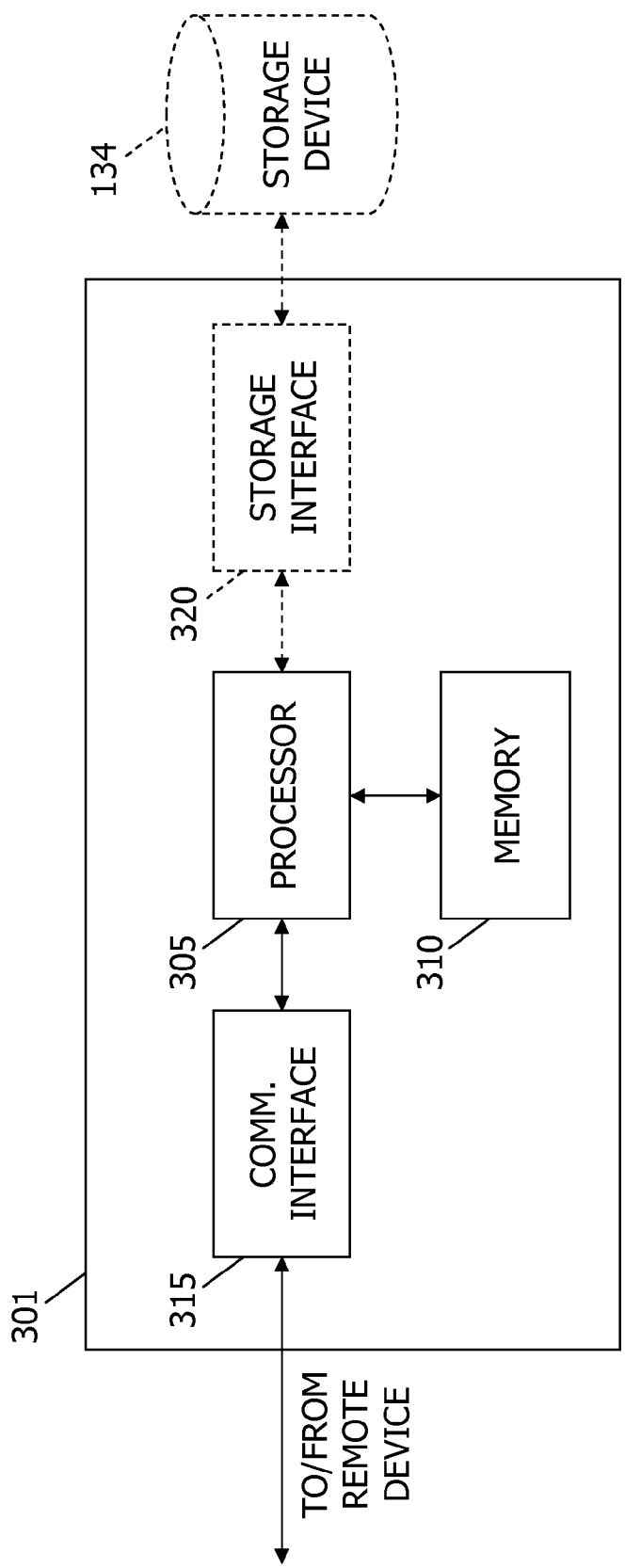

FIG. 4 illustrates an exemplary configuration of a server computer device 301 such as server system 112 (shown in FIGS. 1 and 2). Server computer device 301 may include, but is not limited to, database server 116, transaction server 124, web server 126, fax server 128, directory server 130, and mail server 132.

Server computer device 301 includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from client computer devices 114, 115 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320.

Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory areas 210 and 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
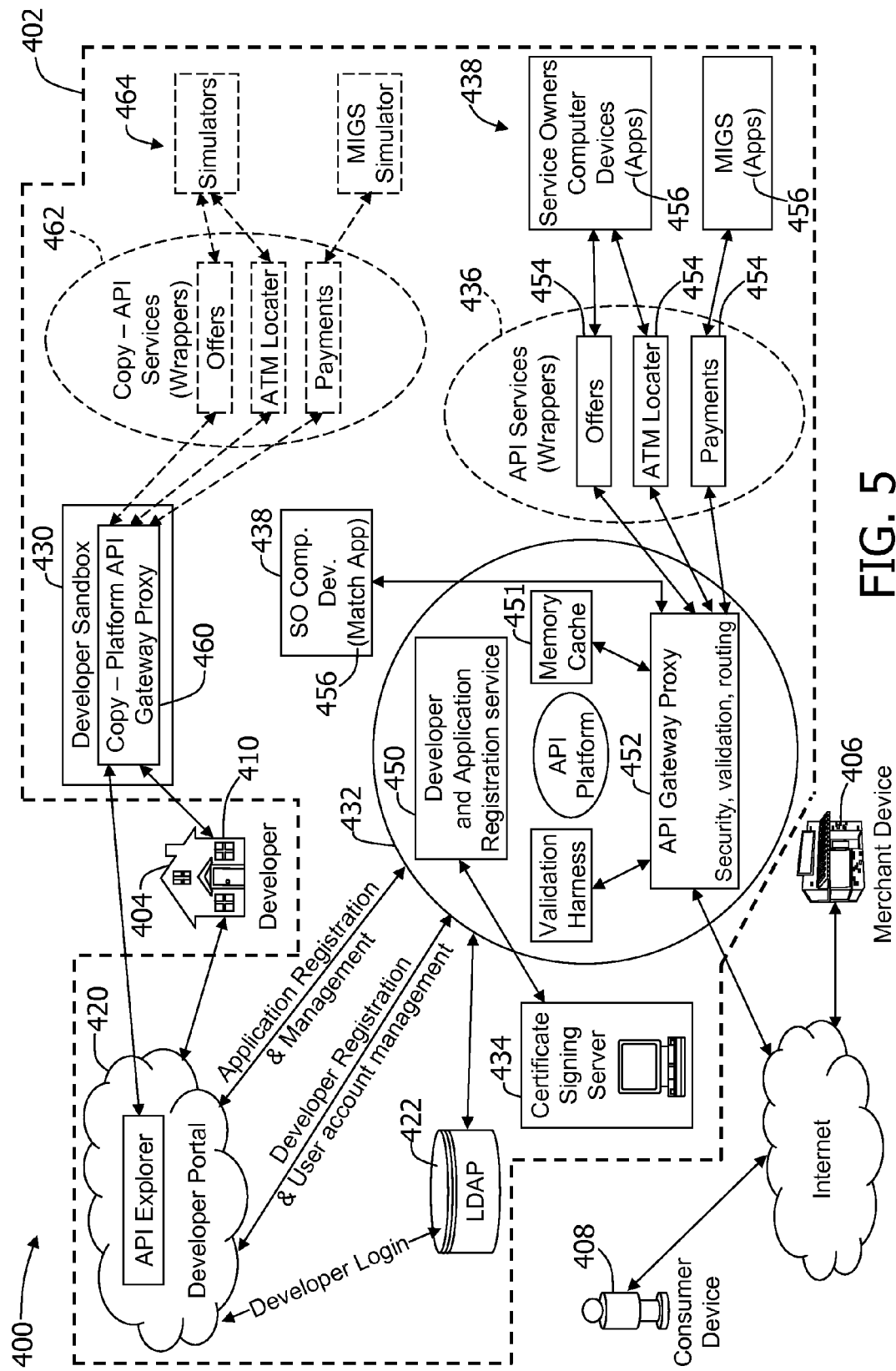

FIG. 5 illustrates an exemplary configuration of a service system 400 in accordance with the present invention. System 400 is similar to systems 100 and 122 (shown in FIGS. 1 and 2). In the example embodiment, system 400 includes a service provider computer system 402 such as SP server system 112 (shown in FIGS. 1 and 2), a developer computer device 404 such as developer computer device 114 (shown in FIGS. 1 and 2), a merchant computer device 406 such as user computer device 115 (shown in FIGS. 1 and 2), and a consumer computer device 408 such as user computer device 115 (shown in FIGS. 1 and 2).

Developer computer device 404 includes a processor for executing instructions. Instructions may be stored in a memory area. The memory area may also include one or more developer applications 410. Applications 410 include computer-implemented instructions that cause a computer device to interact with another computer device. For example, a developer may create an application 410 for locating ATMs included within a network of ATMs serviced by the SP (referred to as the "ATM Locator App"). The ATM Locator App can be stored within the memory area for use by computer device 404. Developer computer device 404 is in communication with SP computer system 402 through a developer portal such as API portal 420, and through a developer sandbox platform 430. As explained below in greater detail, sandbox platform 430 is a test platform provided by SP computer system 402 that enables a developer to test its applications with test data before such applications are rolled out for processing live production data.

SP computer system 402 includes API portal 420, memory device 422, sandbox platform 430, API platform 432, certificate signing server 434, API services wrapper 436, and service owner (SO) computer systems 438.

API portal 420 is configured to communicate with developer computer device 404, and facilitates managing developer registration and login with system 402. API portal 420 also enables developer computer device 404 to communicate with API platform 432. API portal 420 communicates with memory device 422 to facilitate a login by a developer.

API platform 432 includes a registration service 450 that is used to register developers and developer applications 410 with SP computer system 402. Registration service 450 is in communication with certificate signing server 434. API platform 432 also includes an API gateway proxy 452, and a memory cache 451. API platform 432 is also in communication with memory device 422. At least one of memory device 422 and memory cache 451 are configured to store data such as throttling profiles assigned to registered developer applications, throttling counts for registered developer applications, and predefined throttling profiles for service applications having general access.

API platform 432 is in communication with API services wrapper 436. API services wrapper 436 includes wrappers 454 for each service application 456 provided by an SO within SP computer system 402. Service applications 456 are stored at SO computer systems 438. SO computer systems 438 are in communication with API platform 432 through API services wrapper 436 or may be connected directly with API platform 432 without a wrapper.

Continuing with the ATM Locator App example from above, SO computer devices 438 may include a service application 456 that includes data showing a location of each of the ATM machines included within the network serviced by the SP (referred to as the "ATM Locator Service"). In this example, the ATM Locator App, which is stored on developer computer device 404, is able to communicate with SO computer device 438 through API platform 432 and API services wrapper 436 by developer computer device 404 sending a data request to SO computer device 438, and by receiving a data response back from SO computer device 438. Developer computer device 404 is then able to display the location of all the ATMs within the SP network or at least some of the ATMs within the network.

Merchant computer device 406 and consumer computer device 408 each include a processor for executing instructions. Instructions may be stored in a memory area. The memory area may also include one or more developer applications 410 downloaded from developer computer device 404 for use by the merchant, consumer, acquirer, processor, and/or issuer (collectively a "user"). In other words, a developer may develop an application that can be used by a user on their computer devices (e.g., a POS device, a personal computer, smart phone or PDA). The user downloads the application from the developer to their computer device for use by the user, or in some other manner loads the developer application on the user computer device. When the user uses developer application 410, merchant and/or consumer computer devices 406, 408 communicate with SP computer system 402 through API platform 432. Continuing with the ATM Locator App example from above, the user can download the ATM Locator App from developer computer device 404. Consumer computer device 408 is then able to communicate with SO computer devices 438 through API platform 432 and API services wrapper 436 by sending a data request to SO computer devices 438, and by receiving a data response back from SO computer devices 438. Consumer computer device 408 is then able to display the location of all the ATMs within the SP network or at least some of the ATMs with the network.

As discussed above, SP computer system 402 includes a developer sandbox platform 430, which enables a developer to test its applications with test data before such applications are rolled out for processing live production data. Sandbox platform 430 includes a copy 460 of API gateway proxy 452, a copy 462 of API services wrapper 436, and simulator computer devices 464 which are configured to simulate SO computer devices 438. Sandbox platform 430 includes test data that allows a developer to test its applications 410 prior to rolling out applications 410 for production use.

In the example embodiment, a developer visits a web portal, referred to as API portal 420, designed specifically for SP computer system 402. At the home page, developers will be prompted to register with API platform 432. The registration process will collect, and authenticate as required, the following data elements from the developer: first name, last name, username, password, email address, country, street address, city, state/province, postal code, phone number, and company/university affiliation. Additionally, as a condition of registration, developers must opt-in to the program by affirmatively consenting to the terms and conditions and privacy notice. API portal 420 also includes a mechanism for the developers to request access to their information in the event that they desire to change, modify or delete such information.

Once registered and authenticated, developers can log into API portal 420 and access a variety of information regarding the various service applications 456 (e.g., service offerings such as payments, locators, offers, MATCH, etc.). Each service application 456 will have its own page(s) dedicated to describing the business requirements and specifications for that service in a format easily understood by non-industry developers.

Additionally, the developers will be able to log into API portal 420, register a key alias and request a sandbox key. The sandbox key allows developer's applications to access sandbox platform 430, which is an environment where developers can test and validate messages using service simulators 464.

Once a developer has been given a sandbox key, the developer can return to API portal 420 at any time and request a production key. A production key and client ID will be issued for the key alias used by the developer in the developer application. The client ID will identify which key alias is using API platform 432 to process messages and the developer that owns the production key. In the example embodiment, sandbox and production keys are not intended to be transferable or shared.

For every message that API platform 432 processes, the following will be logged: message request type; date and time received; path (message URL); IP address of sender; user agent of sender (name of sending application like IE, Firefox, or a different name); process time; and success or fail. If fail then, error information; client ID; key alias; user ID (system generated ID for developer account that owns the client ID); and unique message ID. There may be additional data elements collected based on the differing requirements of the various API service offerings. For example: for payments that have a merchant, a merchant ID will be logged in addition to the elements listed above.

In the example embodiment, a developer is required to register with SP computer system 402 to access certain information. However, an unregistered developer is able to access some information within SP computer system 402. For example, an unregistered developer can: review available API information, documentation and sample code; access certain functions; and access community pages and read forums. However, an unregistered developer cannot: post forum comments or blogs; create a key alias; or request a sandbox or production key.

API portal 420 provides a mechanism for developers to learn about the services that are available. They have the ability to: register; communicate with other developers via the forums; request keys for sandbox (testing) and production environments; view their personal dashboard; and view metrics on transactions for each key alias they have created. The keys provide message security between the developers and SP computer system 402.

SP computer system 402 allows a developer to interact with API sandbox platform 430. The developer uses sandbox platform 430 for testing and validating applications 410 by using simulators 464. The messages sent by developer applications 410 to API gateway proxy copy 460 are verified with a key. The key verifies that the message was not tampered with between the sender and SP computer system 402. The transaction in the message is authenticated by the backend simulator computer devices 464. The following data elements are collected from the developer during the sandbox key request process: (1) Key Alias: This is the alias the developer assigns to the key. It is used to present a user friendly identifier of the key on the dashboard. The dashboard is a web page on the portal website with the purpose of automatically displaying important information, objects, etc. (2) Description: The description of the key. It is assigned by the developer. Used on the dashboard to present the developer with a description of the key. (3) Use: This identifies if the key is for personal or commercial use. Personal use is an individual that intents to personally use or give to others for their personal use without charge. Commercial use is an individual that is developing for use by their employer or an individual that intends to sell their application to others. (4) Notes: This is free form notes that the developer can associate with the key. (5) Calls: This is the expected number of calls using the production key. It is assigned by the developer. Used by the SP for capacity planning (6) Profitable: This identifies if the developer intends for the key to be used to generate a profit. It is assigned by the developer. (7) Certificate: The SP signs the certificate and makes it available to the developer on the dashboard to download. The developer sandbox key is valid for testing all available API service applications with general access and any premium services that the developer, key alias and client ID have an approved production key.

SP computer system 402 assigns a production key to a developer. During this phase, the developer will be assigned a production key number and that key number will be provided to SP computer system 402 during each call. SP computer system 402 will use the production key number to control access and track developer activity throughout the process. In the example embodiment, an existing key alias and sandbox key are required prior to requesting a production key. The following data elements are collected from the developer during the production key request process: (1) Certificate: SP computer system 402 signs the certificate and makes it available to the developer on the dashboard to download. (2) Production Services Requested: This is a request for which services the production key will be valid.

A developer is able to engage a customer of the SP. The developer can build applications 410 for any of SP's business partners, including merchants, issuers, acquirers, or any other party in the SP network. The following examples describe a developer building a developer application 410 for a merchant user (the user could also be an individual, an acquirer, a processor or an issuer). The developer may be working directly for a merchant or for themselves to sell their application 410 to a merchant. The roles of the developer and merchant are separate. The SP does not have to be part of the relationship between the developer and the merchant. In some embodiments, the merchant may be required to have a relationship with the service application 456 being used, e.g. MiGS (MasterCard Internet Gateway System). The merchant and merchant acquirer would need to be registered with MiGS and have the credentials to prove that relationship is valid prior to using API platform 432.

In the example embodiment, the SP has a trust relationship with an existing merchant. The messages sent by merchant computer device 406 using developer application 410 to API gateway proxy 452 are verified with a key (public and private key). The key verifies that the message was not tampered with between the sender and API platform 432. The transaction in the message is authenticated by the backend service application 456. During this phase, customer authentication is managed by the SO of service application 456 being called.

In the example embodiment, SP computer system 402 includes a certificate signing request (CSR) and a key generation process. This process is started by the developer after registration on API portal 420. The keys/certificates are generated by the developer outside of SP computer system 402 with open source tools (like Open SSL). The SP does not own the developer's private or public key. A developer could theoretically use the same key with multiple open API's or programs not just the open API of the SP. The developer owns their private key, public key and CSR (Certificate Signature Request). The basic steps in the process are as follows: (1) the developer uses an open source tool and requests a CSR; (2) the tool provides a private and public key pair, and the public key is included in the CSR; (3) the developer uploads the CSR which contains the public key to API platform 432; (4) API platform 432 assigns a client ID and signs the certificate request including the developer's public key, wherein the combination of the client ID and the developer's signed certificate (public key) comprises the production key; (5) the developer then uses the client ID (which is included in the production key) in each message sent to API platform 432, the message being digitally signed with the private key from the developer's computer device 404; (6) API platform 432 uses the client ID to identify which public key to use to verify the private key used to sign the message. Tools used to create keys and a CSR typically ask the developer to enter the following information when creating a CSR and key pair: name, organization, organizational unit, city, state or province, and country.

As stated above, API platform 432 is in communication with memory device 422 and includes memory cache 451. Memory device 422 and memory cache 451 are configured to store data such as throttling profiles assigned to registered developer applications, throttling counts for registered developer applications, and predefined general access throttling profiles for service applications having general access. In the example embodiment, a throttling profile is a matrix of criteria that includes at least one of: (i) a throttling amount threshold by timeframe and service application; (ii) a throttling amount threshold by timeframe, service application and developer identity; (iii) a throttling amount threshold by timeframe and developer identity; and (iv) total access across all service applications by timeframe and developer identity. In other words, a throttling profile assigned to a registered developer may include a throttling amount threshold and a throttling time period. The throttling amount threshold is a number of calls or request messages that can be made on a service application. The throttling time period is a time period that the throttling amount threshold is applicable. These throttling profiles may be stored within memory device 422 and/or memory cache 451 for already registered developers, and for general access service applications wherein these general access throttling profiles are predefined by an SO such that they can be assigned to a developer application when it is registered for general access to a service.

In addition to storing the throttling profiles, API platform 432 also stores throttling counts (i.e., a counter) for registered developer applications. These throttling counts are the running total number of request messages made by a particular developer application to a particular service application during the throttling time period. In other words, when a throttling time period starts for a developer application, API platform 432 maintains a counter of each message request for the corresponding developer application until the throttling time period expires. The counter is stored in memory cache 451, and is used for validating the throttling of a request message by confirming that the updated counter (i.e., existing counter number +1) is not greater than the throttling amount threshold. Upon validating the throttling, the API platform forwards the request message on for processing. If throttling is not validated (i.e., existing counter number +1 is greater than the throttling amount threshold), then the API platform will not forward the request message on for further processing.

The methods and systems described herein also enable a service provider to offer to a developer at least one of premium and general access to the data stored within the service provider computer system. The developer is prompted to request premium and/or general access for those services offered by the service provider having both premium and general access.

In the case of requesting premium access, a developer uses a developer computer system to send a request for premium access to a selected service application stored within the SP computer system by accessing the developer portal, and the API platform receives and forwards the developer request for premium access to the SO of the selected service application, who in turn approves or denies the developer request. Each SO being an owner of a particular service or set of services included within the overall SP computer system.

After the SO approves the developer request for premium access, the SO sets a throttling amount threshold and throttling time period, and gets a client ID (which is assigned by the API platform) to the developer application to be passed in messages for service enforcement. The throttling amount threshold and throttling time period defines, at least in part, a throttling profile for the developer. After being notified of the granting of premium access, the developer executes the developer application at the developer computer device which sends a request message to the API platform. The API platform validates the authenticity of the developer application message, counts the request message, and validates the throttling of the request message by comparing the count to the assigned throttling profile before forwarding the developer application message to the proper service application. The service application applies rules—premium access rules in the case of premium access and general access rules in the case of general access—to the developer application message, returns a number of records in response to the applied rules, and sends a service response to the API platform for forwarding to the developer computer device. The developer application receives the service response, and displays or uses the results. In the case of premium access rules, the premium access rules are based on the premium access granted to the developer application, which means the rules may be applied to additional data, with increased speed, with an improved priority, to additional services, and may include individualized or customized billing programs as compared to general access to the service application.

In the example embodiment, the developer application can also be executed by a computer system associated with at least one of a consumer, a merchant, an acquirer, a processor and an issuer (collectively used herein as a "user"). In other words, in some cases, a user can download the developer application from the developer computer system for execution by the user computer device. In this embodiment, the user computer sends a developer application message to the API platform. The API platform validates the authenticity of the developer application message, counts the request message, and validates the throttling of the request message by comparing the count to the assigned throttling profile before forwarding the developer application message to the proper service application. The service application applies rules to the developer application message, returns a number of records in response to the applied rules, and sends a service response to the API platform for forwarding to the user computer device. The developer application receives the service response, and displays the results or uses the results at the user computer system.

As described herein "premium access" refers to access granted to a developer or a developer application for accessing service applications stored on SO computer devices within the SP computer system. Premium access can be granted on a developer basis or on a developer application basis. Premium access is improved or superior access to data and logic stored within the SO computer devices as compared to general access to the SO computer devices. Premium access, as used herein, is defined to include access to additional data, additional bandwidth (i.e., data provided faster), improved data receiving priority, additional services, and individualized billing programs for the services provides as compared to general access to the SO computer devices.

In the case of requesting general access, a developer uses a developer computer system to send a request for general access to a selected service application stored within the SP computer system by accessing the developer portal, and the API platform receives the developer request. The API platform verifies that general access is requested and available, retrieves from a memory device the predefined throttling profile (i.e., the general access throttling profile) for the selected service application, and assigns the general access throttling profile to the developer application. Thus, in the case of general access, the SO predefines the throttling profile for each service application associated with the SO. Those predefined throttling profiles include the throttling amount threshold and throttling time period for general access to the service.

After being granted general access, the developer executes the developer application at the developer computer device which sends a request message to the API platform. The API platform validates the authenticity of the developer application message, counts the request message, and validates the throttling of the request message by comparing the count to the assigned throttling profile, which in this case is the predefined general access throttling profile, before forwarding the developer application message to the proper service application. The service application applies rules to the developer application message, returns a number of records in response to the applied rules, and sends a service response to the API platform for forwarding to the developer computer device. The developer application receives the service response, and displays or uses the results. As explained above, the developer application can also be executed by a user using a user computer system.

In the example embodiment, the API platform enables an SO to offer both general access and premium access to developers. SOs desire the ability to offer a controlled access or "premium access" of their services to developers and business partners, in addition to the general access or open access. Premium and general access may be service-specific. For example, a developer may have an application with general access to Service A, and premium access to Service B.

In the methods and systems described herein, general access and premium access for each service may be optional. For example, it is possible that at least some services may have general access, and some may have premium access as well. Services with general access will provide that access to all developers and will provide standard data throughput and access to all non-restricted data, resources, and functions. Premium access is defined as greater data throughput, access to restricted data, access to restricted resources and restricted functions. Throughput is defined as one or both of the following: (a) number of requests (calls) allowed in a given time frame, and (b) number of records returned for a given request.

In the example embodiment, the SO will have the ability to define general access for their respective services, and will have the ability to define premium access for their respective services. The SO will also be able to define a premium access fee structure for their respective services. In the example embodiment, the SO may negotiate premium access online with a developer or may negotiate premium access to services through more traditional channels.

In the methods and systems described herein the API platform is configured to provide developer usage data to the SP/SO to support invoicing and fee collection for premium/general access. The API platform is also configured to enable the SO to grant and revoke premium/general access at any time.

More specifically, the systems and methods described herein process message requests in the following manner: a) an SO predefines a throttling profile for general access of each service application offering general access including a throttling amount threshold and throttling time period, and stores the general access throttling profile within a service provider (SP) computer system; (b) a developer requests a production key with premium or general access to a service application stored within the SP computer system, wherein the developer submits the request from a developer computer system through a developer portal to the SP computer system; c) an API platform receives the developer request for premium or general access, signs the production key granting general access to any requested service application with general access; (d) in the case of premium access, the API platform sends an email to an SO associated with the requested service application requesting premium access to the requested service application for the developer, the SO logs into the SO application requested by the developer either approving or denying the developer request for premium access, the SO is prompted to select a throttling profile for the developer application after approving the premium access request, and the API platform updates the production key to include access to the approved premium service; e) in the case of general access, the API platform automatically assigns a general access throttling profile for the requested service application wherein a plurality of general access throttling profiles are stored within a memory device in communication with the API platform; f) the throttling profile assigned to the developer application is stored in the memory device; g) the developer or a user executes the developer application having premium or general access such that the developer application sends a message to the API platform, wherein the developer application message includes the client ID and the production key; h) the API platform validates the developer application message by verifying the client ID and production key, and, after validation, counts the request message (i.e., increasing a counter by one for each received request message for this developer application) and validates the request message by comparing the count to the assigned throttling profile; i) the API platform then forwards the developer application request message through an API services wrapper or directly to the corresponding service application at the SO computer system if throttling is validated; j) the corresponding service application applies rules to the developer application message, returns a number of records in response to the applied rules, and sends a service response having a bill code to the API platform; k) the API platform stores a message history of the service response with the bill code, removes the bill code from the service response, and sends the response to the developer computer device (if the developer sent the developer application message) or to the user computer device (if a consumer, merchant, acquirer and/or issuer sent the developer application message); and l) the developer application receives the service response, and displays or uses the results.

In the financial service system described herein the bill code enables the SO to create a billing report for the developer. The SO requests a billing report from the API platform for a specific time period, and the API platform builds the report based on the bill code. The API platform stores the billing report in the database in a location designated by the SO. The SO is then able to bill the developer for using the SO service application. In the example embodiment, the SO and the developer are able to negotiate and enter into a customized or individualized billing program for providing premium access to the service application. These billing programs are typically based at least in part on a number of application request messages submitted to the service application by the developer application during a predefined period of time.

Figure 6A:
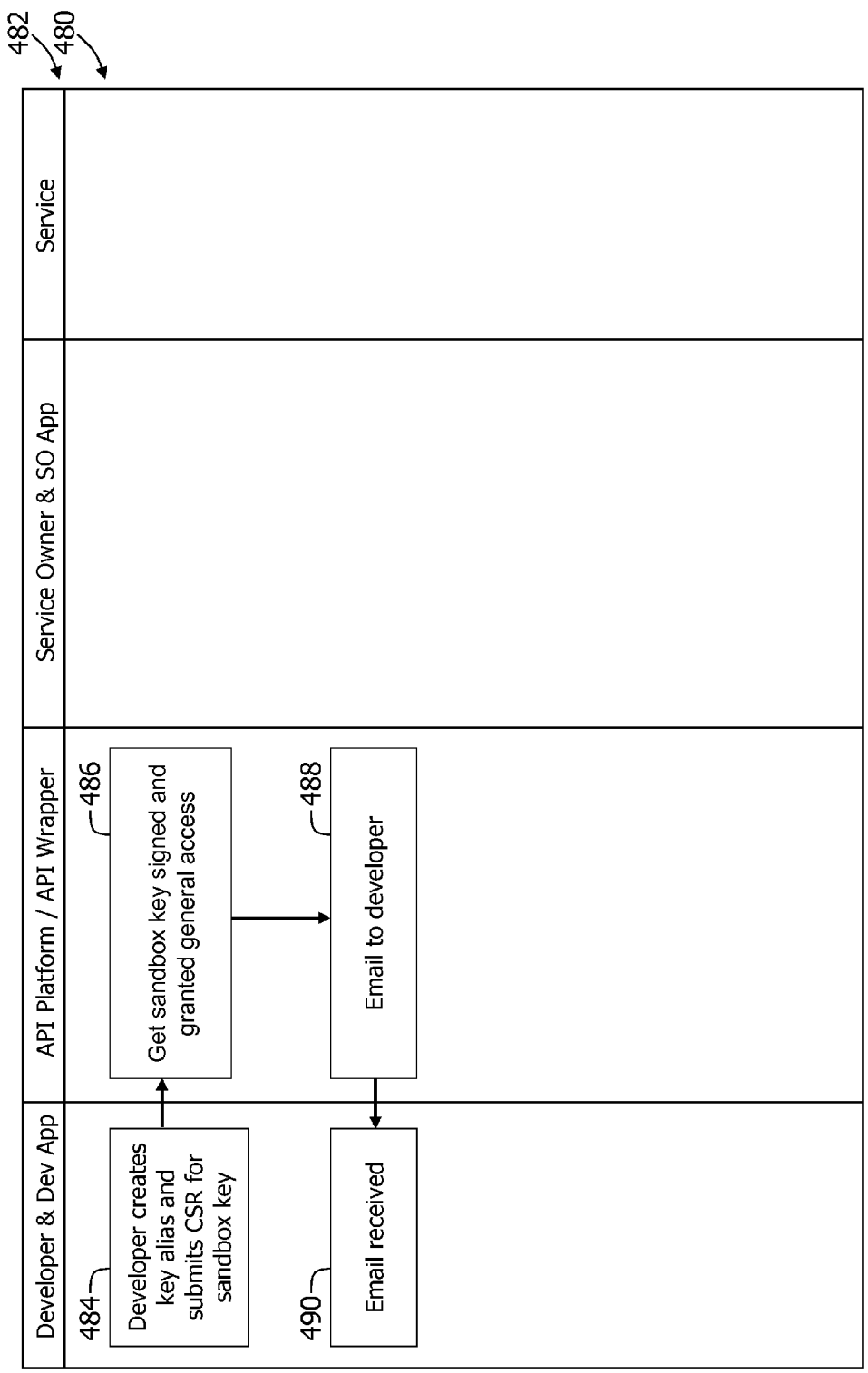
FIGS. 6A and 6B are data flow charts showing an exemplary process of providing premium access to the service provider computer system shown in FIG. 5 using an open API.

FIG. 6A is a data flow chart showing a first portion 480 of an exemplary process 482 of providing premium access to a service provider computer system such as computer system 402 (shown in FIG. 5). Components shown in FIG. 6A that are identical to components shown in FIG. 5 are labeled with the same reference numbers used in FIG. 5. Process 482 is implemented using SP computer system 402, developer computer device 404, merchant computer device 406, and consumer computer device 408.

First portion 480 of process 482 includes a developer creating 484 a key alias and submitting a CSR (certificate signing request) for a sandbox key. Developer computer device 404 submits the CSR to sandbox platform 430. Sandbox platform 430 signs 486 the sandbox key and grants general access to the requested simulated service application stored on simulator computer devices 464. Sandbox platform 430 sends 488 an email to developer confirming the issuance of the sandbox key and general access being granted. Developer computer device 404 receives 490 the email from sandbox platform 430.

Figure 6B:
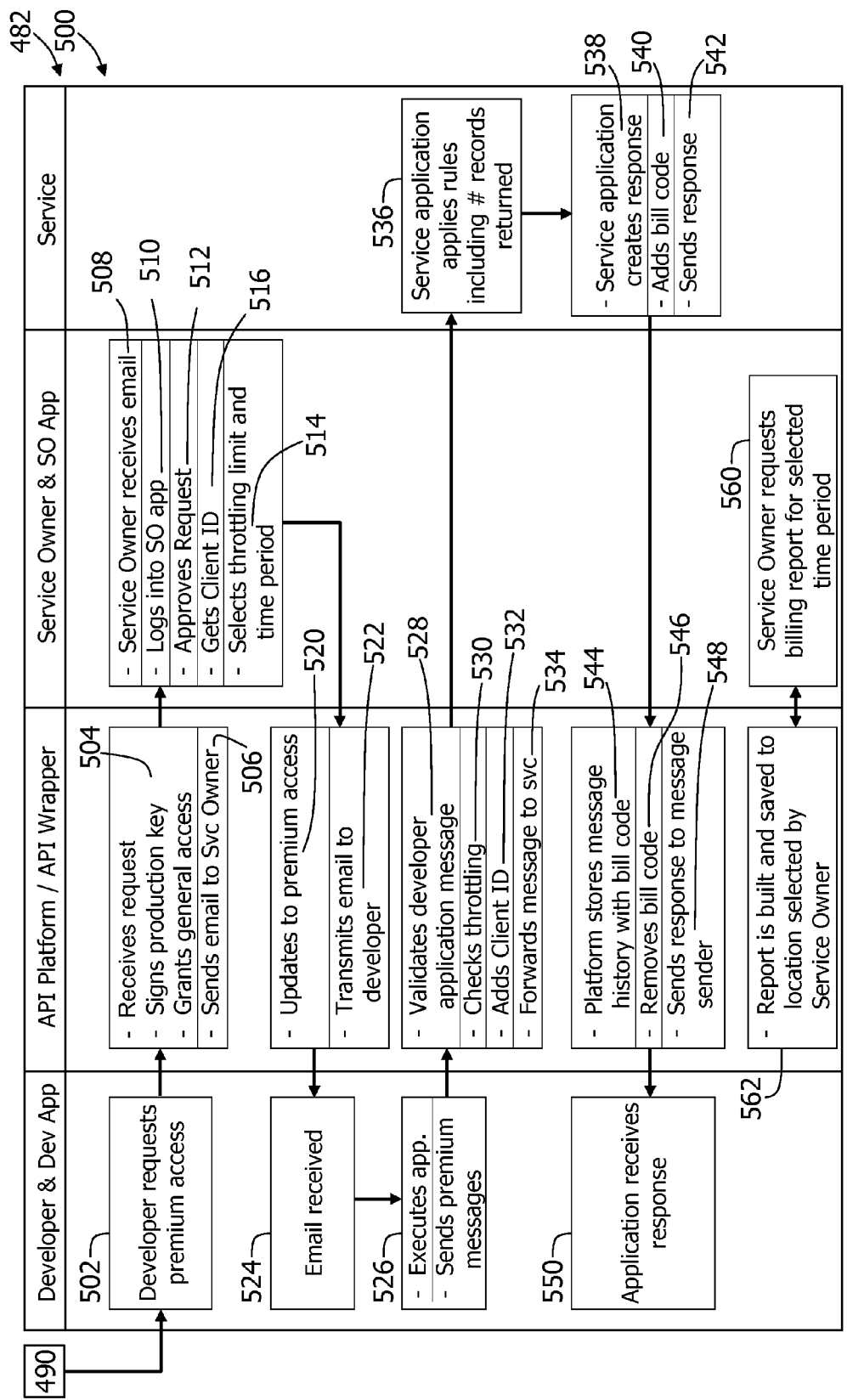

First portion 480 of process 482 then continues on to a second portion 500 of process 482 shown in FIG. 6B.

FIG. 6B is a data flow chart showing a second portion 500 of exemplary process 482 of providing premium access to a service provider computer system such as computer system 402 (shown in FIG. 5). Components shown in FIG. 6B that are identical to components shown in FIG. 5 are labeled with the same reference numbers used in FIG. 5. Second portion 500 of process 482 is implemented using SP computer system 402, developer computer device 404, merchant computer device 406, and consumer computer device 408.

Second portion 500 of process 482 includes a developer requesting 502 premium access including a production key to a particular service application 456 (the "first service application") stored on SO computer system 438. The developer request is submitted through developer portal 420, which is accessed via developer computer device 404. Portal 420 displays a user interface that prompts the developer to request a service application 456, such as first service application, offered by the SO via SO computer devices 438. Each key alias has a client ID, which enables developer computer system 404 to access the specific service application offered by the SO on SO computer device 438 through API platform 432 if the client ID has been approved by the SO.

API platform 432 receives 504 the developer request for premium access, signs the production key and grants general access to the developer for the first service application. API sends 506 an email to SO computer devices 438 requesting premium access to the first service application for the developer. A production key is only granted general access if a general service has been requested. If a premium service is requested that has a general service also then the general service will be granted. For example: if Locations Service Application has a general service and a premium service, and the developer requests the premium service then the general service will be granted immediately. If the developer requests MATCH Service Application which has premium service only then the client ID will not be granted any service access until the request is approved.

SO computer devices 438 receives 508 the email from API platform 432 and API services wrapper 436. The SO logs 510 into the SO application requested by the developer using SO computer devices 438. The production key request user interface is displayed on SO computer device 438 including the additional data fields designated for input by the SO. The SO selects the developer and key alias from a dropdown box, and selects 512 decline or approve for granting premium access to the first service application. If the SO selects decline, then a text box is provided for an explanation which can be emailed to the developer. If the SO selects approve, then the SO is prompted to select 514 a throttling amount threshold and throttling time period (i.e., a throttling profile), and gets 516 client ID already assigned to the developer to be passed in messages for service enforcement. The SO is provided the client ID so they can set up their service to handle requests from the specific approved source.

The production key for the developer is updated 520 from general access to premium access, and an email is transmitted 522 to notify the developer of the change in access to the requested service application. The email notifying the developer of the change in access is transmitted through API platform 432 to developer computer device 404.

The developer receives 524 the email at developer computer device 404 and updates its records to reflect premium access being granted to the requested service application. The developer executes 526 the developer application at developer computer device 404. The developer application sends a premium message to API platform 432. The developer premium application message includes the client ID and the production key provided by the API platform. API platform 432 validates 528 the developer premium application message by verifying the client ID and production key. After validation 528, API platform 432 checks 530 the throttling limit assigned to the developer application, captures the client ID from the message, and adds 532 the client ID to a header of the message. API platform 432 and API services wrapper 436 forward 534 the developer premium application message to the corresponding service application, the first service application.

The first service application applies 536 rules to the developer premium application message, and returns a number of records in response to the applied rules. The first service application creates 538 a response based at least in part on the number of returned records, adds 540 a bill code to the service response, and sends 542 the service response to API platform 432 through API services wrapper 436. In the example embodiment, the bill code may be optional depending on the service setup between the SO and the API platform.

API platform 432 stores 544 a message history of the service response with the bill code. API platform 432 removes 546 the bill code from the service response, and sends 548 the response to developer computer device 404. The developer application receives 550 the service response, and displays or uses the results.

In the example embodiment, the bill code enables the SO to create a billing report for the developer. The SO requests 560 a billing report from API platform 432 for a specific period of time (monthly, quarterly, yearly), and API platform 432 builds 562 the report based on the bill code. API platform 432 stores the billing report in memory device 422 in a location designated by the SO. The SO is then able to bill the developer for using the SO service application.

As described above, in the case where general access is requested, the API platform automatically assigns a general access throttling profile for the requested service application to the developer application, wherein a plurality of general access throttling profiles are stored within memory device 422 or memory cache 451. The general access throttling profile is then used to validate the request message.

FIG. 7 is an exemplary user interface 700 for a production key request. Components shown in FIG. 7 that are identical to components shown in FIGS. 5 and 6 are labeled with the same reference numbers used in FIGS. 5 and 6.

User interface 700 is displayed when developer computer device 404 accesses developer portal 420 and the developer requests a production key. As stated above, process 482 includes a developer requesting 502 premium access including a production key to a particular service application 456 stored on SO computer system 438. The developer request is submitted through developer portal 420, which is accessed via developer computer device 404. Portal 420 displays a user interface, namely user interface 700, that prompts the developer to request a service application 456 offered by the SO via SO computer devices 438. Each developer key alias has a production key or client ID that will be provided in each message, and if that client ID is approved by the SO(s) then developer computer system 404 is able to access the specific service application offered by the SO on SO computer device 438.

User interface 700 includes premium services 702 and general (free) services 704. Each service offered under premium services 702 is listed with a checkbox for selection by the developer. Each service offered under general services 704 is listed with a checkbox for selection by the developer. In addition, user interface 700 includes certificate request file data box 706 which enables a developer to attach to the production key request a CSR (Certificate Signature Request). As explained above, when the developer uploads the CSR, the CSR contains the public key. API platform 432 uses the client ID received with each message and the developer's public key to verify that each message received by API platform 432 has not been tampered with.

FIG. 8 is an exemplary user interface 800 for a premium service request approval displayed for the SO on a SO computer device 438 (shown in FIG. 5). Components shown in FIG. 8 that are identical to components shown in FIGS. 5 and 6 are labeled with the same reference numbers used in FIGS. 5 and 6.

User interface 800 includes a developer and key alias request pull down 802, a name, an address, an email address, a telephone number, a company name, a key alias name, and key alias description. The developer information is submitted to SO computer device 438 for approval. The premium service request approval user interface 800 also includes data fields requiring input from the SO upon receiving the request from the developer. These SO data fields include approve or deny premium access pull-down 804, client ID pull-down 806, throttling amount pull-down 808, throttling time period pull-down 810, and comments section 812. In addition, a billing reports section 814 is included on user interface 800.

FIG. 9 is a data flow chart showing an exemplary process 900 of validating a throttling profile for a developer application accessing service provider computer system 402 (shown in FIG. 5). Components shown in FIG. 9 that are identical to components shown in FIG. 5 are labeled with the same reference numbers used in FIG. 5. Process 900 is implemented using SP computer system 402, developer computer device 404, merchant computer device 406, and consumer computer device 408.

Process 900 includes storing 902 a throttling profile for a developer application within at least one of memory device 422 and memory cache 451. The throttling profile includes a throttling amount threshold and a throttling time period. Process 900 further includes storing 904 a counter for the developer application within at least one of memory device 422 and memory cache 451. The counter tracks an access count for the developer application.

API platform 432 receives 906 a developer request message initiated by the developer application, and identifies 908 the identity of the developer application. Based on the identity of the developer application, API platform retrieves 910 the throttling profile for the developer application and retrieves 912 the access count for the developer application from either memory device 422 or memory cache 451. API platform 432 increases 914 the access count by 1 and compares 916 the updated access count to the throttling profile. More specifically, API platform 432 compares 916 the updated access count to the throttling amount threshold. If the updated access count is not greater than the throttling amount threshold, then API platform 432 validates 918 the request message as complying with the throttling profile. If, however, the updated access count is greater than the throttling amount threshold, then API platform 432 sends 920 an error message to developer computer system 404 notifying the developer that the throttling amount threshold has been exceeded.

API platform 432 stores 922 the updated access count in memory device 422 or memory cache 451 as the new access count, and forwards 924 the developer request message to the SO for further processing (i.e., applying rules to the developer request message, returning the number of records in response to the applied rules, and sending a service response based at least in part on the number of returned records to the user computer device).

API platform 432 also checks 926 the time of the request message relative to the throttling time period (i.e., the API platform determines whether the throttling time period has expired). If the throttling time period has expired, then API platform 432 updates 928 the new access count by setting it to zero and starts a new throttling time period on the next request message. If the throttling time period has not expired, then API platform 432 keeps 930 the new access count set at the stored 922 updated access count. Throttling by access and time frame may be applied to any type of request message customized to specific entities.

FIG. 10 is a data flow chart showing an exemplary process 950 of registering, verifying, and providing a signed digital certificate to a developer in real time for accessing service provider computer system 402 (shown in FIG. 5). Process 950 is implemented using SP computer system 402, developer computer device 404, merchant computer device 406, and consumer computer device 408 (shown in FIG. 5).

Process 950 includes receiving 952 registration data at API platform 432 from developer computer device 404. The registration data is submitted by the developer through API portal 420. The registration data includes data relating to the developer or developer application such as key alias, first name, last name, username, password, email address, country, street address, city, state/province, postal code, phone number, and company/university affiliation. In addition to the registration data, API platform also receives 954 a certificate signing request (CSR) from developer computer device 404, which is uploaded through API portal 420. The CSR includes a public key associated with the developer. The developer generates a private and public key pair using tools outside of the service provider computer system. The public key is uploaded with the CSR to API platform 432.

After receiving 952 registration data and receiving 954 the CSR, API platform 432 assigns 956 a client ID to the developer's key alias. The key alias having been selected by the developer for identifying the developer application within service provider computer system 402. More specifically, API platform 432 uses API registration service 450 to assign 956 a client ID to the developer's key alias. API platform 432 forwards 958 the registration data and the CSR to certificate signing server 434. Certificate signing server 434 verifies 960 the registration data, signs 962 the certificate request, and returns 964 the signed certificate to API platform 432 in real time. Verification 960 and signing 962 processes are automatically performed by certificate signing server 434 without any intervention or input by a person associated with service provider computer system 402. Accordingly, verification 960 and signing 962 are performed in real time without delay for manual intervention.

Verification 960 includes certificate signing server 434 verifying the registration data provided by the developer by automatically validating the data found in the CSR request against the registration data provided by the developer. In other words, certificate signing server 434 validates the registration data by comparing the registration data provided by the developer to the data found in the CSR request. In another embodiment, verification 960 may include a plurality of data checks performed by certificate signing server 434 to ensure that the developer is authentic and someone the SP is willing to exchange information with. The data checks may include at least one of: (1) a comparison of the developer provided data to the Specially Designated Nationals (SDN) List published by the Office of Foreign Assets Control (OFAC), (2) a comparison of the developer provided data to lists of designated fraudulent merchants and/or consumers stored by the SP, and (3) a comparison of the geolocation of the developer's computer device to a list of countries with denied access.

For example, certificate signing server 434 may verify the registration data provided by the developer by comparing the provided data to the Specially Designated Nationals (SDN) List published by the Office of Foreign Assets Control (OFAC) to ensure that the SP is not granting data access to a developer listed on the SDN List. If certificate signing server 434 determines that developer is included on the SDN List, then certificate signing server 434 rejects the CSR request and denies access to SP computer system 402. In another example, certificate signing server 434 may verify the registration data provided by the developer by comparing the developer provided data to lists of fraudulent merchants and/or consumers stored by the SP to ensure that the SP is not granting data access to a developer with a history of fraudulent activities. If certificate signing server 434 determines that developer is included on one of the fraudulent lists, then certificate signing server 434 rejects the CSR request and denies developer's access to SP computer system 402. In another example, certificate signing server 434 may verify the registration data provided by the developer by determining the geolocation of developer's computer device 404 and comparing it to a list of countries having been denied access, wherein the geolocation is determined by SP computer system 402 through its interaction with developer's computer device 404 via developer portal 420 and API platform 432. If certificate signing server 434 determines that the geolocation of developer's computer device 404 is actually within a country designated for denied access (e.g., for security reasons, etc.), then certificate signing server 434 rejects the CSR request and denies developer's access to SP computer system 402.

After a positive verification, API platform 432 stores 966 within memory device 422 the client ID and the signed digital certificate (developer's public key). The combination of the client ID and the developer's public key comprises the production key. API platform 432 sends 968 the client ID and the signed digital certificate to the developer at developer computer device 404. The registration process is then complete.

In the future, when developer application 410 sends 980 a message request to service provider computer system 402, API platform 432 receives 982 the message request which includes the client ID and a digital signature created with the private key of the developer. Since the message request includes the signed certificate, API platform 432 identifies 984 developer application 410 associated with the received message request by comparing the received client ID to the corresponding client ID stored within memory device 422. In addition, API platform 432 retrieves 986 the public key stored within memory device 422 and associate with the client ID. API platform 432 verifies 988 the digital signature used to sign the message request by using the public key retrieved 986 from memory device 422 to decrypt the message request. Each subsequent message request received by API platform 432 is verified in the same manner, verifying that the message was sent by the developer application and has not been tampered with. More specifically, the API platform authenticates the request message as being untampered with and originating from the developer application by using the retrieved public key to verify the digital signature of the request message.

In the example embodiment, the API portal includes API services documentation pages which include an explanation of service levels between general and multiple premium levels, and the process to obtain premium access. In addition, a developer may be required to register with service provider computer system 402 and provide certain additional information such as a developer pseudo ICA and an acquirer ICA (Interbank Card Association).

The systems and methods described herein also enable a developer to request a sandbox key and create a key alias. The sandbox key is a key that allows a developer to test their applications in a test area within system 402 such that the application being tested is provided test data from system 402 and not real data. A new sandbox key may be granted with access to all existing services with general access.

In the example embodiment, a request for a production key may use a popup with a premium selection for services with premium access. The developer will be prompted to select general access or premium access for each service offered. If premium is selected and there is a general option, then system 402 will grant general access to the developer. In some cases, certain services may only have general access or only have premium access. A production key with a premium access request will still be generated immediately with general access granted if any of the services requested have general access. For example: in the case where a developer requests premium access for ATM locations, the production key will be granted general access until premium access is approved; any message using the production key will be throttled based on general throttling; and messages will be forwarded without a client ID or with a client ID set for general access.

As explained above, when a production key for premium access is requested, an email is sent as notification for the SO to log into an application to approve and manage requests. The email may contain a link to a service management application. The service management application could be part of the API portal or a separate application. The email sent to the SO includes, developer name, alias name, and premium access requested. The system may include a configurable time limit to respond to a request by the service with the result of denying access. For example: SO offers a service having a 7 day time limit to respond to a request for premium access. If the request has not been approved or denied in 7 days, it is automatically denied.

The service management application would allow the SO to log in and review pending requests, and then approve or decline premium service access. The SO would have the ability to select a developer and a key alias. After making the developer and alias selection, a screen would display at least the developer name, contact information, alias name, alias description, and premium access requested. The SO would have the ability to approve or deny access, select throttling limits and throttling time limits based from the service setup. The API platform generates a client ID that the service uses to apply rules to messages. The API platform will include the client ID in messages sent to a service from the specified key alias.

The system is also configured to send an email to the developer for notifying the developer as to whether the request has been approved or denied. The system is also configured to allow the SO to view all developers and key alias approval status and transaction metrics by developer and/or by key alias. The system is configured to enable an SO to view, grant and revoke premium access.

The SO provides content for service documentation pages that are accessible through the API portal. The system will also include a list of premium service levels, descriptions, and a designation showing which services require billing reports. The system will provide if a service is general only, premium only, or general and premium. The client ID will be added to messages to allow the service to determine what rules to apply to a message. The system will include a list of pre-established bill codes per service that may be returned with each message from the service that identifies the billing level of the transaction. The system will include a list of throttling settings (numbers of requests), and a SO setup page or registration page.

The system, and more specifically the API platform, may be configured to perform throttling by service, service level or production key level (client ID). All service level enforcement functionality will be handled by each service. The API platform will provide the client ID with each message. The API platform validates each message that comes through prior to sending to service. The API platform rejects any unauthorized requests.

In the example embodiment, the system includes a sandbox key to allow a developer to test an application using test data. All general services may be made available to every sandbox key. In addition, the sandbox key may be configured to allow a developer to test premium services and methods once the developer and client ID are approved.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-based method for signing a digital certificate in real-time for accessing a service application hosted within a service provider (SP) computer system through an open application programming interface (API) platform, the API platform in communication with a memory device, said method comprising:
   receiving registration data from a developer computer device, the developer computer device associated with a developer and configured to store one or more developer applications, the registration data including a plurality of key aliases associated with a single one of the one or more developer applications, the plurality of key aliases selected by the developer for identifying the single one of the one or more developer applications within the service provider computer system;
   receiving, by the open API platform, a plurality of certificate signing requests (CSR) from the developer computer device, each key alias associated with more than one of the plurality of CSRs, each CSR including a public key associated with the developer, each CSR associated with more than one of B an the plurality of key aliases;
   verifying, automatically by a certificate signing server in real-time, the data in each CSR against the registration data provided by the developer to determine that the registration data is associated with the developer;
   assigning, by the service provider computer device, at least one client ID to the plurality of key aliases selected by the developer and associated with the verified registration data, the client ID identifying which public key of the plurality of public keys associated with the plurality of key aliases to use to verify a private key used to sign messages from the verified developer;
   signing each CSR to produce a signed digital certificate after verifying the registration data, wherein the verifying and signing steps are performed by the SP computer system in real-time; and
   transmitting the signed digital certificates and the at least one client ID to the respective developer computer device.

2. A computer-based method in accordance with claim 1, wherein receiving registration data further comprises:
   receiving registration data at the API platform, the registration data including data describing the developer including at least one of a first name, a last name, a username, a password, an email address, a country, a street address, a city, a state/province, a postal code, a phone number, and a company or university affiliation.

3. A computer-based method in accordance with claim 1, wherein receiving a plurality of certificate signing requests (CSR) further comprises:

receiving at the API platform the plurality of CSRs including the public key and a key alias, the public key having a corresponding private key, the public and private keys being associated with the developer, the key alias being a name representing an identity of the developer application;

assigning the client ID to the key alias at the API platform; and forwarding the CSR to a certificate signing server.

4. A computer-based method in accordance with claim 1, wherein verifying the registration data further comprises:

automatically verifying the registration data at a certificate signing server in real-time without direct input by a person, wherein the verifying step includes authenticating the received registration data as describing the developer.

5. A computer-based method in accordance with claim 1, wherein signing the CSR further comprises:

automatically signing the CSR to produce a signed digital certificate at a certificate signing server in real-time without direct input by a person, wherein the signed digital certificate is configured to be sent with each message request initiated by the developer application and received by the SP computer system for authenticating the message request as being untampered with and sent by the developer application.

6. A computer-based method in accordance with claim 1 further comprising:

receiving at the API platform the CSR including the public key and a key alias, the public key having a corresponding private key, the public and private key being associated with the developer, the key alias being a name representing an identity of the developer application;

assigning the client ID to the key alias at the API platform;

storing within the memory device the client ID and the public key;

receiving at the API platform a request message initiated by the developer application, the request message including the client ID and a digital signature created with the private key;

identifying the request message as being associated with the developer application based at least in part on the received client ID;

retrieving the public key for the developer stored within the memory device and associated with the received client ID; and authenticating the request message as being untampered with and originating from the developer application by using the retrieved public key to decrypt the digital signature created with the private key.

7. A computer-based method in accordance with claim 1, wherein verifying the registration data further comprises:

automatically verifying the registration data at the SP computer system by performing at least one data check, wherein the data check includes comparing the registration data to a Specially Designated Nationals (SDN) List published by the Office of Foreign Assets Control (OFAC).

8. A computer-based method in accordance with claim 1, wherein verifying the registration data further comprises:

automatically verifying the registration data at the SP computer system by performing at least one data check, wherein the data check includes comparing the registration data to at least one fraud list identifying at least one of fraudulent merchants and fraudulent consumers.

9. A computer-based method in accordance with claim 1, wherein verifying the registration data further comprises:

automatically verifying the registration data at the SP computer system by performing at least one data check, wherein the data check includes comparing a geolocation associated with the developer computer device to a list of countries having been denied access to the SP computer system.

10. A computer system for signing a digital certificate in real-time for accessing a service application hosted within a service provider (SP) computer system through an open application programming interface (API) platform, the computer system comprising:

a memory device for storing data; and a service provider (SP) computer system comprising a processor and an open API platform, the SP computer system in communication with the memory device, said SP computer system programmed to:

receive registration data from a developer computer device, the developer computer device associated with a developer and configured to store a developer application, the registration data including a plurality of key aliases associated with the developer application, the plurality of key aliases selected by the developer for identifying the developer application within the service provider computer system;

receive a plurality of certificate signing requests (CSR) from the developer computer device,
each CSR including a public key associated with the developer,
each CSR associated with more than one of the plurality of key aliases,
each key alias associated with more than one of the plurality of CSRs;

verify the registration data as being associated with the developer;

assign, by the service provider computer device, a client ID the developer associated with the verified registration data, the client ID identifying which public key of a plurality of public keys associated with each verified developer to use to verify a private key used to sign messages from the verified developer;

sign the CSR to produce a signed digital certificate after verifying the registration data, wherein the verifying and signing steps are performed by the SP computer system in real-time; and transmit the signed digital certificate and the client ID to the respective developer computer device.

11. A computer system in accordance with claim 10, wherein the SP computer system is further programmed to:

receive at the API platform the CSR including the public key and a key alias, the public key having a corresponding private key, the public and private keys being associated with the developer, the key alias being a name representing an identity of the developer application;

assign the client ID to the key alias at the API platform; and forward the CSR to a certificate signing server.

12. A computer system in accordance with claim 10, wherein the SP computer system is in communication with a certificate signing server, and wherein the SP computer system is further programmed to:

automatically verify the registration data at the certificate signing server in real-time without direct input by a person, wherein the verifying step includes authenticating the received registration data as describing the developer.

13. A computer system in accordance with claim 10, wherein the SP computer system is in communication with a certificate signing server, and wherein the SP computer system is further programmed to:

automatically sign the CSR to produce a signed digital certificate at the certificate signing server in real-time without direct input by a person, wherein the signed digital certificate is configured to be sent with each message request initiated by the developer application and received by the SP computer system for authenticating the message request as being untampered with and sent by the developer application.

14. A computer system in accordance with claim 10, wherein the SP computer system is further programmed to:

automatically verify the registration data by performing at least one data check, wherein the data check includes comparing the registration data to a Specially Designated Nationals (SDN) List published by the Office of Foreign Assets Control (OFAC).

15. A computer system in accordance with claim 10, wherein the SP computer system is further programmed to:

automatically verify the registration data by performing at least one data check, wherein the data check includes comparing the registration data to at least one fraud list identifying at least one of fraudulent merchants and fraudulent consumers.

16. A computer system in accordance with claim 10, wherein the SP computer system is further programmed to:

automatically verify the registration data by performing at least one data check, wherein the data check includes comparing a geolocation associated with the developer computer device to a list of countries having been denied access to the SP computer system.

17. One or more computer-readable non-transitory media comprising a computer-executable program that instructs at least one processor to sign a digital certificate in real-time for accessing a service application hosted within a service provider (SP) computer system through an open application programming interface (API) platform, said computer-executable program comprising at least one code segment that instructs the at least one processor to:

receive registration data from a developer computer device, the developer computer device associated with a developer and configured to store a developer application, the registration data including a plurality of key aliases associated with the developer application, the plurality of key aliases selected by the developer for identifying the developer application within the service provider computer system;

receive a plurality of certificate signing requests (CSR) from the developer computer device, the CSR including a public key associated with the developer, each CSR associated with more than one of the plurality of key aliases, each key alias associated with a single developer application, each key alias associated with more than one of the plurality of CSRs;

verify the registration data as being associated with the developer;

assign, by the service provider computer device, a client ID to the developer associated with the verified registration data, the client ID identifying which public key of a plurality of public keys associated with the verified developer to use to verify a private key used to sign messages from the verified developer;

sign the CSR to produce a signed digital certificate after verifying the registration data, wherein the verifying and signing steps are performed in real-time; and transmit the signed digital certificate and the client ID to the respective developer computer device.

18. A computer-readable non-transitory media in accordance with claim 17, wherein the at least one code segment instructs the at least one processor to:

receive the CSR including the public key and a key alias, the public key having a corresponding private key, the public and private keys being associated with the developer, the key alias being a name representing an identity of the developer application;

assign the client ID to the key alias; and forward the CSR to a certificate signing server.

19. A computer-readable non-transitory media in accordance with claim 17, wherein the at least one code segment instructs the at least one processor to:

automatically verify the registration data in real-time without direct input by a person, wherein the verifying step includes authenticating the received registration data as describing the developer.

20. A computer-readable non-transitory media in accordance with claim 17, wherein the at least one code segment instructs the at least one processor to:

automatically sign the CSR to produce a signed digital certificate in real-time without direct input by a person, wherein the signed digital certificate is configured to be sent with each message request initiated by the developer application and received by the SP computer system for authenticating the message request as being untampered with and sent by the developer application.

21. A computer-readable non-transitory media in accordance with claim 17, wherein the at least one code segment instructs the at least one processor to:

automatically verify the registration data by initiating at least one data check, wherein the data check includes comparing the registration data to a Specially Designated Nationals (SDN) List published by the Office of Foreign Assets Control (OFAC).

22. A computer-readable non-transitory media in accordance with claim 17, wherein the at least one code segment instructs the at least one processor to:

automatically verify the registration data by initiating at least one data check, wherein the data check includes comparing the registration data to at least one fraud list identifying at least one of fraudulent merchants and fraudulent consumers.

23. A computer-readable non-transitory media in accordance with claim 17, wherein the at least one code segment instructs the at least one processor to:

automatically verify the registration data by initiating at least one data check, wherein the data check includes comparing a geolocation associated with the developer computer device to a list of countries having been denied access to the SP computer system.

* * * * *